United States Patent
Yuan et al.

(10) Patent No.: US 9,615,270 B2
(45) Date of Patent: Apr. 4, 2017

(54) INTELLIGENT POWER UTILIZATION COMMUNICATION PRODUCT DETECTING SYSTEM

(71) Applicants: State Grid Corporation of China, Beijing (CN); Jibei Electric Power Company Limited Center of Metrology, Beijing (CN)

(72) Inventors: Ruiming Yuan, Beijing (CN); Haiting Tian, Beijing (CN); Hanji Ju, Beijing (CN); Siqi Li, Beijing (CN); Zhonglin Yi, Beijing (CN); Hengchun Ding, Beijing (CN); Chen Wang, Beijing (CN); Tongjia Wei, Beijing (CN); Yang Wang, Beijing (CN); Xiaoxi Tian, Beijing (CN)

(73) Assignees: State Grid Corporation of China, Beijing (CN); Jibei Electric Power Company Ltd Center Metrology, Beijing (CN)

( * ) Notice: Subject to any disclaimer, the term of this patent is extended or adjusted under 35 U.S.C. 154(b) by 296 days.

(21) Appl. No.: 14/415,018

(22) PCT Filed: Nov. 4, 2013

(86) PCT No.: PCT/CN2013/086488
§ 371 (c)(1),
(2) Date: Jan. 15, 2015

(87) PCT Pub. No.: WO2015/062104
PCT Pub. Date: May 7, 2015

(65) Prior Publication Data
US 2016/0309352 A1 Oct. 20, 2016

(51) Int. Cl.
*H04B 17/00* (2015.01)
*H04W 24/06* (2009.01)
(Continued)

(52) U.S. Cl.
CPC ......... *H04W 24/06* (2013.01); *H02J 13/0079* (2013.01); *H04W 24/02* (2013.01)

(58) Field of Classification Search
CPC .... H04W 24/06; H04W 24/02; H02J 13/0079
(Continued)

(56) References Cited

U.S. PATENT DOCUMENTS 9,204,325 B2 * 12/2015 Subramanian ........ H04W 24/06
2011/0143581 A1 6/2011 Brenneman et al.

FOREIGN PATENT DOCUMENTS

| CN | 1611955 | * | 5/2005 |
| CN | 1611955 | A | 5/2005 |

(Continued)

OTHER PUBLICATIONS

"International Search Report dated Jul. 30, 2014," International Application No. PCT/CN2013/086488, 3 pages.

*Primary Examiner* — Wesley Kim
*Assistant Examiner* — Raj Chakraborty
(74) *Attorney, Agent, or Firm* — Hogan Lovells US LLP

(57) ABSTRACT

The present invention provides an intelligent power utilization communication product detecting system suitable for an intelligent power grid. The system includes: a simulation master station, including a master station computer and master station software and configured to perform communication data interaction with a detected acquisition terminal and determine the communication performance of the intelligent power utilization communication system according to the communication data interaction result; a remote wireless communication test and channel simulation subsystem, configured to test detected products; a local communication test and channel simulation subsystem, configured to perform channel environment simulation on a local communication channel between the detected products and complete com- (Continued)

munication performance test on the detected products; and a purification power supply subsystem, configured to provide electric energy and matched impedance and isolate external interference noise. The present invention may be used for accurately and comprehensively simulating main characteristics of multistage communication channels in the intelligent power grid and testing main performance indexes of multiple communication products in the intelligent power grid so as to provide a technical support for communication product detection in the intelligent power grid.

13 Claims, 22 Drawing Sheets

(51) Int. Cl.
  *H02J 13/00* (2006.01)
  *H04W 24/02* (2009.01)
(58) Field of Classification Search
  USPC .................................................. 455/67.14
  See application file for complete search history.

(56) References Cited

FOREIGN PATENT DOCUMENTS

| CN | 1921260 A | 2/2007 |
| CN | 102053202 A | 5/2011 |
| CN | 103023146 A | 4/2013 |

\* cited by examiner

INTELLIGENT POWER UTILIZATION COMMUNICATION PRODUCT DETECTING SYSTEM

RELATED APPLICATIONS

This application is a United States National Stage Application filed under 35 U.S.C 371 of International Application No. PCT/CN2013/086488, filed Nov. 4, 2013, the disclosure of all of which is hereby incorporated by reference in its entirety.

TECHNICAL FIELD

The present invention relates to the technical field of power systems, specifically relates to an intelligent power utilization communication product detecting system, and in particular relates to a communication product detection and channel environment simulation system applied in the intelligent power utilization field in intelligent power grids.

BACKGROUND OF THE INVENTION

With the construction of intelligent power grids, various communication devices in the intelligent power utilization field are increasingly applied, and may realize multiple functions of automatic acquisition of electric energy information, metering abnormity monitoring, electric energy quality monitoring, power utilization analysis and management, related information release, distributed energy monitoring, information interaction of intelligent power utilization devices and the like.

Communication devices in an intelligent power grid mainly include an electric energy meter and various communication terminals, wherein the electric energy meter is a metering device with high precision and functions of intelligent charge control, electricity price and electricity quantity information storage, balance alarm, remote information transmission and the like and is an end node in an intelligent power grid communication network; and the communication terminals are devices for information processing, storage, control instruction issuing and state detection, and may be divided into a power generation side monitoring terminal, a transformer substation monitoring terminal, a power distribution network monitoring terminal, an intelligent power utilization acquisition terminal, a special transformer user acquisition terminal, a distributed energy monitoring terminal, an electric energy quality monitoring terminal and the like according to application places.

Communication channels of an intelligent power utilization field communication system may be divided into a remote communication channel and a local communication channel, wherein the remote communication channel is used for data transmission communication between a master station system and an acquisition terminal, and common communication modes of the remote communication channel at present include optical fiber private network communication, wireless public network communication (GPRS/CDMA), wireless private network communication and the like; and the local communication channel is used for data transmission communication between the acquisition terminal and an electric energy meter, and common communication modes of the local communication channel at present include RS-485 communication, low-voltage power line carrier communication, micro-power wireless network communication and the like.

FIG. 1 shows a schematic diagram of a common intelligent power utilization communication system at present. The intelligent power utilization communication system includes a common electric energy meter 101, a local acquisition terminal 200, an intelligent electric energy meter 102, a communication terminal 300 and a master station 400, wherein the local acquisition terminal 200 is connected with the common electric energy meter 101 through an RS-485 line, the local acquisition terminal 200 and the intelligent electric energy meter 102 are connected with the communication terminal 300 through a local communication channel, and the communication terminal 300 is connected with the master station 400 through a remote communication channel. In the construction of the intelligent power utilization communication system, the key of ensuring secure and stable operation of the system is to select a stable, reliable, real-time and secure communication mode, which directly affects the reliability of communication between the master station and the acquisition terminal and between the acquisition terminal and the electric energy meter and the acquisition success rate. How local and remote communication modes are reasonably selected according to the geographical environment and the distribution condition of a low-voltage power utilization network has decisive significance for subsequent construction, popularization and application of the intelligent power utilization communication system. To evaluate the communication performance of the communication channels in the intelligent power utilization communication system, some simulation and detection systems for communication channels have appeared in the prior art, and most of these simulation systems may only separately simulate a certain type of communication channels (e.g. systems which may only simulate low-voltage power line carrier communication channels). However, the practical communication system for the intelligent power grid is generally involved with multiple kinds of communication channels at the same time. To really and comprehensively reflect the channel characteristics of each link of the intelligent power grid, an overall simulation system capable of comprehensively covering various communication channels in the power grid urgently needs to be developed, so as to realize performance detection of various communication products applied in the intelligent power grid.

SUMMARY OF THE INVENTION

The main aim of the present invention is to provide an intelligent power utilization communication product detecting system suitable for an intelligent power grid, for overcoming the defects that the communication channel simulation technology developed in the prior art may only be used for separately simulating a certain type of communication channels, may not accurately and comprehensively reflect the communication performance of an intelligent power utilization field communication system, meanwhile, is single in detection category and may not realize comprehensive detection.

To fulfill the above aim, embodiments of the present invention provide an intelligent power utilization communication product detecting system. The intelligent power utilization communication product detecting system includes a simulation master station, a remote wireless communication test and channel simulation subsystem, a local communication test and channel simulation subsystem and a purification power supply subsystem, wherein the simulation master station includes a simulation master station computer and a simulation master station control unit and is connected with the remote wireless communication test and channel simulation subsystem; the simulation master station is configured to perform information interaction with a detected product through the remote wireless communication test and channel simulation subsystem, control the detected product and determine the communication performance of the detected product according to the information interaction result; the remote wireless communication test and channel simulation subsystem is connected with the master station computer and the detected product respectively, and is configured to simulate the channel characteristic of a wireless private network communication channel and/or the channel characteristic of a wireless public network communication channel, convert signals transmitted between the master station computer and the detected product and simulate the influence on the signals in the transmission process; the local communication test and channel simulation subsystem is connected with each detected product, and is configured to simulate the channel characteristic of a local communication channel, convert signals transmitted between the detected products and simulate the influence on the signals in the transmission process; and the purification power supply subsystem is connected with the master station computer, the remote wireless communication test and channel simulation subsystem, the local communication test and channel simulation subsystem and each detected product respectively, and is configured to provide electric energy and matched impedance and isolate interference noise.

Further, the intelligent power utilization communication product detecting system further includes a centralized control computer, wherein the centralized control computer is connected with the remote wireless communication test and channel simulation subsystem and the local communication test and channel simulation subsystem and configured to determine the channel characteristic of a remote communication channel, control the remote wireless communication test and channel simulation subsystem to work, determine the channel characteristic of a local communication channel and control the local communication test and channel simulation subsystem to work.

Further, the remote wireless communication test and channel simulation subsystem simulates the channel characteristic of the wireless public network communication channel according to a 2G/3G wireless public network channel model and simulates the channel characteristic of the wireless private network communication channel according to a 230 MHz wireless private network channel model.

Further, the remote wireless communication test and channel simulation subsystem further includes a wireless comprehensive tester, a wireless public network channel simulator and a radio-frequency attenuator, wherein the wireless comprehensive tester is connected with the master station computer, the wireless public network channel simulator and the radio-frequency attenuator respectively and configured to perform bottom layer protocol processing on signals transmitted by the master station computer and then transmit the processed signals to the wireless public network channel simulator, perform downlink wireless comprehensive test processing on signals returned by the wireless public network channel simulator and then transmit the processed signals to the radio-frequency attenuator, perform uplink wireless comprehensive test processing on signals transmitted by the radio-frequency attenuator and then transmit the processed signals to the wireless public network channel simulator, perform bottom layer protocol processing on the signals returned by the wireless public network channel simulator and then transmit the processed signals to the master station computer; the wireless public network channel simulator is connected with the wireless comprehensive tester and configured to simulate the channel characteristic of the wireless private network communication channel and/or the channel characteristic of the wireless public network communication channel; and the radio-frequency attenuator is connected with the wireless comprehensive tester and an acquisition terminal respectively and configured to simulate the attenuation characteristic of radio-frequency signals and attenuate signals transmitted between the wireless comprehensive tester and the acquisition terminal.

Further, the wireless public network channel simulator simulates the channel characteristic of a 2G/3G wireless cellular network communication channel, performs 2G/3G wireless cellular network communication channel characteristic influence simulation on the signals transmitted by the wireless comprehensive tester and then returns the signals to the wireless comprehensive tester.

Further, the centralized control computer is connected with the wireless comprehensive tester, the wireless public network channel simulator and the radio-frequency attenuator respectively, and is specifically configured to determine the channel characteristic of the 2G/3G wireless cellular network communication channel and control the wireless comprehensive tester and/or the wireless public network channel simulator and the radio-frequency attenuator to work.

Further, the local communication test and channel simulation subsystem includes a micro-power wireless communication test and channel simulation subsystem and a low-voltage power carrier communication detection and channel simulation subsystem.

Further, the micro-power wireless communication test and channel simulation subsystem specifically includes a spectrum analyzer, a receiver tester, a vector signal source, an index testing computer and circulators, wherein the spectrum analyzer is configured to down-convert tested signals into intermediate frequency signals by using internal local oscillation and transmit the intermediate frequency signals to the receiver tester for analysis; the receiver tester is configured to digitally process the intermediate frequency signals input by the spectrum analyzer, perform attenuation simulation on the digital signals, set corresponding channel parameters according to different application environments and simulate the attenuation characteristic when the tested signals pass through different districts; the vector signal source is configured to up-convert the signals simulated by the receiver tester, convert the intermediate frequency signals to the frequency of the originally input radio-frequency signals and set the attenuation value of the signals in the whole simulation process; the index testing computer is configured to control signal transmission and test and analyze the signals up-converted by the vector signal source; and the circulators are connected with the spectrum analyzer and the vector signal source respectively and configured to isolate a transmitting link and a receiving link of the whole system, so that the whole system forms a two-way link.

Further, the low-voltage power carrier communication detection and channel simulation subsystem specifically includes a low-voltage distribution network channel characteristic simulation device, an acquisition terminal carrier module interface card device and an electric energy meter carrier module interface card device, wherein the low-voltage distribution network channel characteristic simulation device is connected with the purification power supply subsystem and configured to simulate low-voltage distribution network channel characteristics including noise characteristic, transmission impedance characteristic, loss attenuation characteristic, multipath transmission interference characteristic and load impedance characteristic of signals output by the purification power supply subsystem; the acquisition terminal carrier module interface card device is connected with the purification power supply subsystem and the low-voltage distribution network channel characteristic simulation device and configured to provide electric energy and communication connection for the communication devices connected with the acquisition terminal carrier module interface card device; and the electric energy meter carrier module interface card device is connected with the purification power supply subsystem and the low-voltage distribution network channel characteristic simulation device and configured to provide electric energy and communication connection for an electric energy meter connected with the electric energy meter carrier module interface card device.

Further, the centralized control computer is connected with the low-voltage distribution network channel characteristic simulation device, the acquisition terminal carrier module interface card device and the electric energy meter carrier module interface card device, and is configured to communicate with the acquisition terminal carrier module interface card device to test the communication devices, communicate with the electric energy meter carrier module interface card device to test the electric energy meter and control low-voltage distribution network channel characteristic simulation of the low-voltage distribution network channel characteristic simulation device.

Further, the purification power supply subsystem includes a first isolating circuit, a second isolating circuit and a third isolating circuit, wherein the first isolating circuit is arranged between an external power supply network and the communication system, the second isolating circuit is arranged between the communication system and the detected product, and the third isolating circuit is arranged in a communication channel between a detected transmitter and a detected receiver of the detected product.

Further, the first isolating circuit includes a circuit breaker, a first isolating transformer for isolating high-frequency noise and pulse noise, a first linear impedance stabilizing network for inhibiting same frequency interference of a test band, a leakage protector and an air switch, which are sequentially connected with each other; the second isolating circuit includes a second isolating transformer, a first EMI filter for filtering power supply noise and an inductive magnet ring for inhibiting space coupling noise and tester conducting noise, which are sequentially connected with each other; and the third isolating circuit includes a third isolating transformer arranged at the detected transmitter end, a second EMI filter and a second linear impedance stabilizing network connected with the detected transmitter, which are sequentially connected with each other.

Further, the purification power supply subsystem further includes a fourth isolating transformer, a third EMI filter and a third linear impedance stabilizing network connected with the detected receiver, which are sequentially arranged at the receiver end of the detected product; or, an AC-DC converter for converting an AC power-frequency power supply into a DC power supply, a DC-AC inverter for converting the DC power supply into the AC power supply and a fourth linear impedance stabilizing network connected with the detected receiver, which are sequentially arranged at the detected receiver end.

According to the present invention, the remote and local communication performance of the intelligent power utilization communication product detecting system may be detected by adopting the remote wireless communication test and channel simulation subsystem and the local communication test and channel simulation subsystem, so that the technical effect of comprehensively detecting the intelligent power utilization field communication system is achieved.

BRIEF DESCRIPTION OF THE DRAWINGS

Various other advantages and benefits are clear for those of ordinary skill in the art by reading detailed descriptions of preferred implementations below. The accompanying drawings are merely used for the purpose of illustrating the preferred implementations, rather than limiting the present invention. Moreover, throughout the accompanying drawings, the same components are indicated by the same reference signs. In the drawings.

DETAILED DESCRIPTION OF THE EMBODIMENTS

Exemplary embodiments of the present disclosure will be described in more detail below with reference to the accompanying drawings. Although the exemplary embodiments of the present disclosure are shown in the accompanying drawings, it should be understood that, the present disclosure may be realized in various forms but not limited to the embodiments described herein. Reversely, these embodiments are provided for understanding the present disclosure more thoroughly and completely conveying the scope of the present disclosure to those skilled in the art.

A clear and complete description of technical solutions in the embodiments of the present invention will be given below, in combination with the accompanying drawings in the embodiments of the present invention. Apparently, the embodiments described are merely a part, but not all, of the embodiments of the present invention. All of other embodiments, obtained by those of ordinary skill in the art based on the embodiments of the present invention without any inventive efforts, fall into the protection scope of the present invention.

In view of the defects that a communication channel simulation technology for power systems and communication systems, developed in the prior art, may only be used for separately simulating a certain type of communication channels and may not accurately and comprehensively reflect the communication performance of a communication system under a power grid application scenario, the embodiments of the present invention provide an intelligent power utilization communication product detecting system suitable for an intelligent power grid, which may be used for simulating channel characteristics of main communication technologies in the intelligent power utilization field and testing the performance indexes of communication products applied in the intelligent power utilization field so as to provide a technical support for ensuring secure and stable operation of an intelligent power utilization field communication system. The present invention will be described in detail below in combination with the accompanying drawings.

Figure 1:
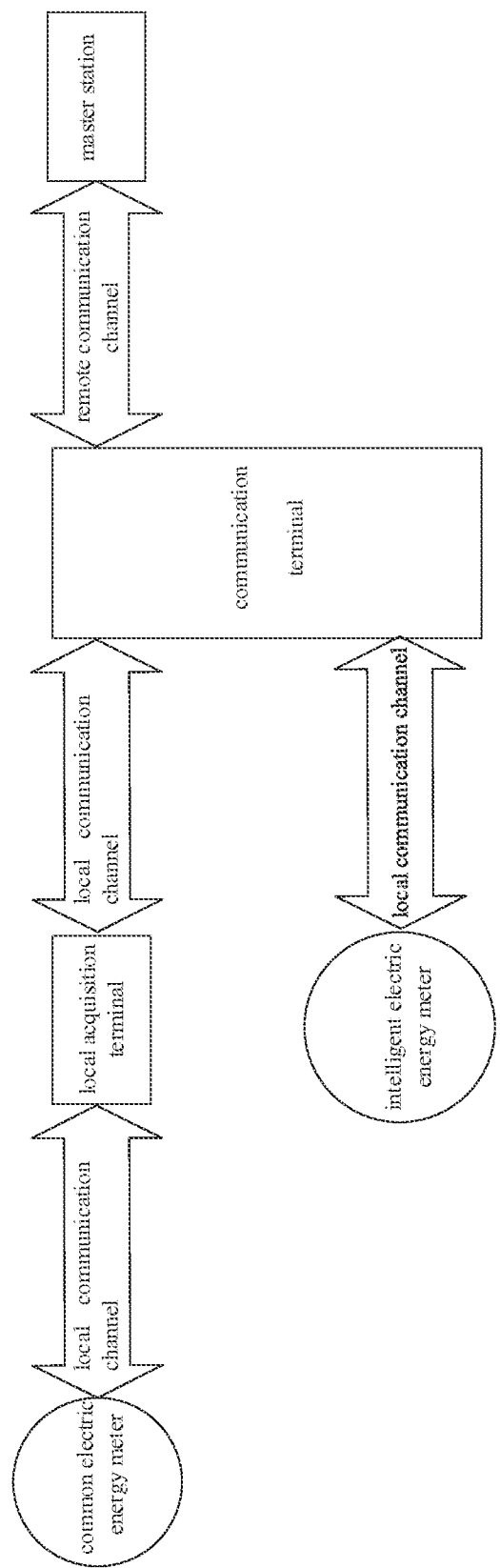
FIG. 1 is a schematic diagram of an intelligent power utilization communication system in the prior art.
Figure 2:
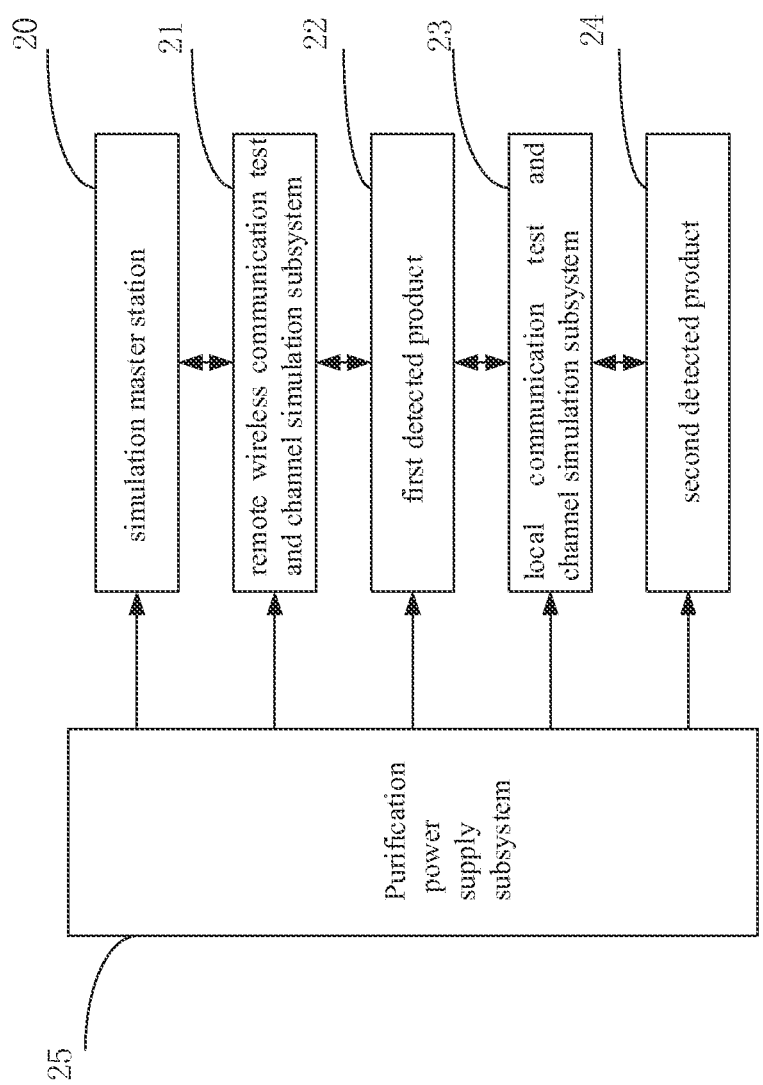
FIG. 2 is a structural diagram of an intelligent power utilization communication channel simulation and communication product detecting system suitable for an intelligent power grid provided by the first embodiment of the present invention.

This embodiment provides an intelligent power utilization communication channel simulation and communication product detecting system suitable for an intelligent power grid. As shown in FIG. 2, the simulation system includes a simulation master station 20, a remote wireless communication test and channel simulation subsystem 21, a first detected product 22, a local communication test and channel simulation subsystem 23, a second detected product 24 and a purification power supply subsystem 25, wherein the simulation master station 20 is connected with the remote wireless communication test and channel simulation subsystem 21 and configured to perform communication data interaction with the first detected product 22 through the remote wireless communication test and channel simulation subsystem 21 and determine the communication performance of the first detected product 22 according to the communication data interaction result; the remote wireless communication test and channel simulation subsystem 21 is connected with the simulation master station 20 and the first detected product 22 respectively, and is configured to simulate the channel characteristic of a remote wireless communication channel, specifically simulate the channel characteristic of a wireless public network communication channel according to a 2G/3G wireless public network channel model or simulate the channel characteristic of a wireless private network communication channel according to a 230 MHz wireless private network channel model, convert signals transmitted between the simulation master station 20 and the detected product 22 and simulate the influence on the signals in the transmission process, so as to test the first detected product 22.

The first detected product 22 is simultaneously connected with the remote wireless communication test and channel simulation subsystem 21 and the local communication test and channel simulation subsystem 23. Thus, the first detected product 22 performs communication data interaction with the simulation master station 20 through the remote wireless communication test and channel simulation subsystem 21, and performs communication data interaction with the second detected product 24 through the local communication test and channel simulation subsystem 23.

The local communication test and channel simulation subsystem 23 is simultaneously connected with the first detected product 22 and the second detected product 24, and is configured to simulate the channel characteristic of a local communication channel, convert signals transmitted between the first detected product 22 and the second detected product 24 and simulate the influence on the signals in the transmission process.

The second detected product 24 is connected with the local communication test and channel simulation subsystem 23, and is configured to perform communication data interaction with the first detected product 22 through the local communication test and channel simulation subsystem 23.

In the technical solution of this embodiment, the system further includes the purification power supply subsystem 25, which is simultaneously connected with the simulation master station 20, the remote wireless communication test and channel simulation subsystem 21, the local communication test and channel simulation subsystem 23, the detected product 22 and the detected product 24 and configured to provide electric energy and matched impedance and isolate interference noise.

Figure 3:
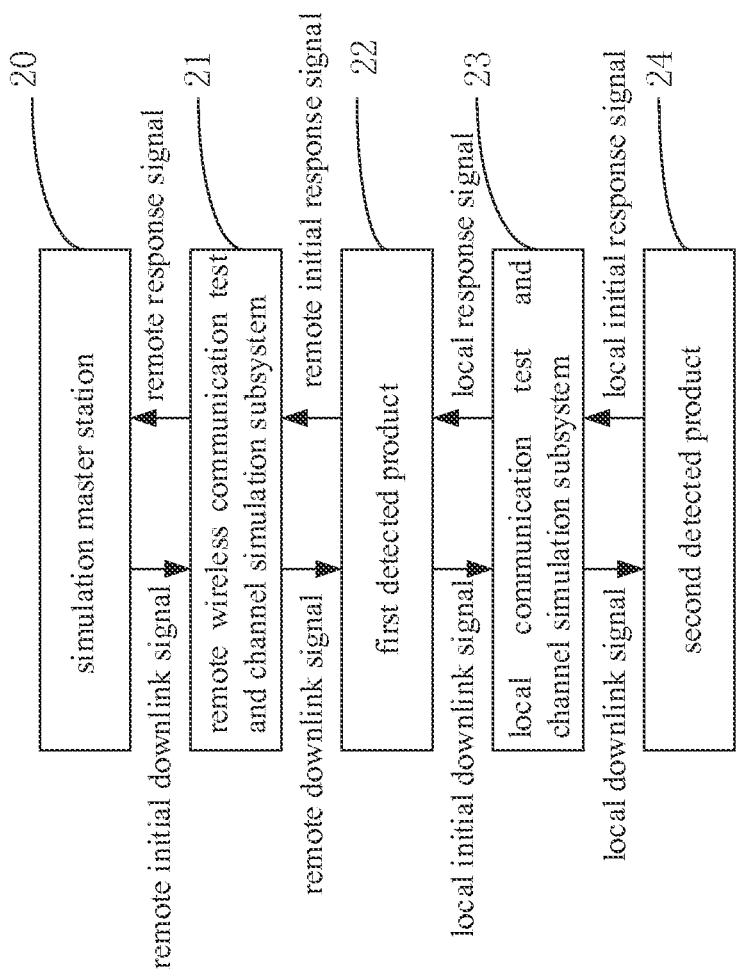
FIG. 3 is a schematic diagram of an internal signal transmission relation of an intelligent power utilization communication channel simulation and communication product detecting system suitable for an intelligent power grid provided by the present invention.

As shown in FIG. 3, the internal signal transmission relation of the system of this embodiment is as follows.

The simulation master station 20 transmits a remote initial downlink signal to the remote wireless communication test and channel simulation subsystem 21 in a downlink, receives a remote response signal returned by the remote wireless communication test and channel simulation subsystem 21 in an uplink, and determines the communication performance of the intelligent power utilization communication system according to the remote response signal. Those skilled in the art could understand that, the specific information of the remote response signal is the response made by the detected product 22 or 24 after receiving a simulation signal transmitted by the remote wireless communication test and channel simulation subsystem 21 or the local communication test and channel simulation subsystem 23, so that it is reliable and accurate to detect the communication performance of the communication system accordingly. The specific judgment manner may be determined according to different response of communication devices in different states, which will not be further described herein.

In the downlink, the remote wireless communication test and channel simulation subsystem 21 receives the remote initial downlink signal transmitted by the simulation master station 20, performs downlink remote communication channel influence simulation on the remote initial downlink signal to obtain a remote downlink signal and transmits the remote downlink signal to the first detected product 22; and in the uplink, the remote wireless communication test and channel simulation subsystem 21 receives a remote initial response signal returned by the first detected product 22, performs uplink remote communication channel characteristic influence simulation on the remote initial response signal to obtain the remote response signal, and transmits the remote response signal to the simulation master station 20.

In the downlink, the first detected product 22 receives the remote downlink signal, generates a local initial downlink signal according to the remote downlink signal and transmits the local initial downlink signal to the local communication test and channel simulation subsystem 23; and in the uplink, the first detected product 22 receives a local response signal returned by the local communication test and channel simulation subsystem 23, generates the remote initial response signal according to the local response signal and transmits the remote initial response signal to the remote wireless communication test and channel simulation subsystem 21.

In the downlink, the local communication test and channel simulation subsystem 23 receives the local initial downlink signal transmitted by the first detected product 22, performs downlink local communication channel characteristic influence simulation on the local initial downlink signal to obtain a local downlink signal and transmits the local downlink signal to the second detected product 24; and in the uplink, the local communication test and channel simulation subsystem 23 receives a local initial response signal returned by the detected product 24, performs uplink local communication channel characteristic influence simulation on the local initial response signal to obtain the local response signal and transmits the local response signal to the first detected product 22.

The second detected product 24 receives the local downlink signal in the downlink, generates the local initial response signal according to the local downlink signal, and transmits the local initial response signal to the local communication test and channel simulation subsystem 23 in the uplink.

The communication channel simulation system provided by this embodiment is designed according to a practical intelligent power utilization communication system, wherein the simulation master station 20 may be realized by adopting computer equipment installed with software for testing the function of the master station of the communication system and is configured to simulate the function of the master station in the practical communication system. In the communication channel simulation system provided by this embodiment, a signal is transmitted between the simulation master station 20 and the detected product 22 through the remote wireless communication test and channel simulation subsystem 21, a signal is transmitted between the detected product 22 and the detected product 24 through the local communication test and channel simulation subsystem 23, and when the simulation master station 20 performs communication data interaction with the detected product 22 through the remote wireless communication test and channel simulation subsystem 21 to acquire a remote response signal and the detected product 22 performs communication data interaction with the detected product 24 through the local communication test and channel simulation subsystem 23 to acquire a local response signal, because the remote response signal includes related information of the local response signal, the remote response signal itself reflects the communication performance of the remote communication channel and the communication performance of the local communication channel, and the simulation master station 20 may judge the communication performance of the remote wireless communication test and channel simulation subsystem 21 and the local communication test and channel simulation subsystem 23 by receiving the remote response signal, namely judge the communication performance of the whole intelligent power utilization communication system.

The first detected product 22 and the second detected product 24 may respectively adopt a common power utilization information acquisition terminal and a common intelligent electric energy meter in the practical communication system. For example, according to different user type, the first detected product 22 may be a special transformer acquisition terminal for acquiring power utilization information of a special transformer user, or a distributed energy monitoring terminal for detecting and controlling a user-side distributed energy system connected to a public power grid, or a centralized meter reading terminal for acquiring power utilization information of a low-voltage user, e.g. an acquisition terminal. The second detected product 24 may be a common metering device with functions of electricity price and electricity quantity information storage, balance alarm and the like, or an electric energy meter with functions of electricity price and electricity quantity information storage, balance alarm, communication and acquisition at the same time.

The remote wireless communication test and channel simulation subsystem 21 is configured to simulate the channel characteristic of the remote communication channel used by the practical communication system, and the local communication test and channel simulation subsystem 23 is configured to simulate the channel characteristic of the local communication channel used by the practical intelligent power utilization communication system. For example, when the remote communication channel used by the practical communication system is an optical fiber private network communication channel/wireless public network communication channel/wireless private network communication channel, correspondingly, the remote wireless communication test and channel simulation subsystem 21 is configured to simulate the channel characteristic of the wireless public network communication channel/wireless private network communication channel; and when the local communication channel used by the practical intelligent power utilization communication system is a low-voltage power line carrier communication channel/micro-power wireless network communication channel, correspondingly, the local communication test and channel simulation subsystem 23 is configured to simulate the channel characteristic of the low-voltage power line carrier communication channel/micro-power wireless network communication channel.

The communication channel simulation system provided by this embodiment simulates of the characteristics of main types of communication channels in the intelligent power utilization communication system by simulating the remote communication channel and the local communication channel, and can really and comprehensively reflect the communication performance of the whole intelligent power utilization communication system; and compared with the prior art, the embodiment of the present invention may accurately and comprehensively simulate the basic characteristics of all types of communication channels of the intelligent power utilization communication system, and then may provide good reference information for communication channel construction of the practical intelligent power utilization communication system.

Figure 4:
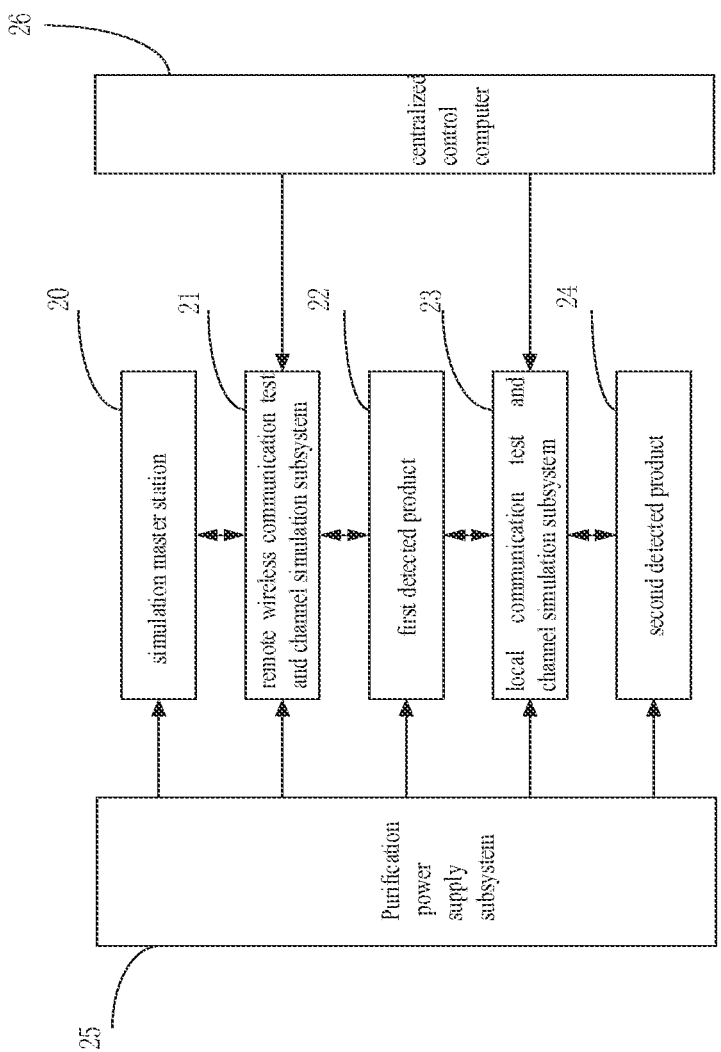
FIG. 4 is a structural diagram of an intelligent power utilization communication channel simulation and communication product detecting system suitable for an intelligent power grid provided by another preferred embodiment of the present invention.

As shown in FIG. 4, given is a more preferred solution in this embodiment. The provided communication channel simulation system further includes a centralized control computer 26, which is simultaneously connected with the remote wireless communication test and channel simulation subsystem 21 and the local communication test and channel simulation subsystem 23. The centralized control computer 26 is configured to determine the channel characteristic of the remote communication channel and control the remote wireless communication test and channel simulation subsystem 21 to work; and the centralized control computer 26 is also configured to determine the channel characteristic of the local communication channel and control the local communication test and channel simulation subsystem 23 to work. The centralized control computer 26 performs centralized operation on low-voltage distribution network channel characteristic simulation devices, so that automation and remote control of a channel simulation flow may be realized, hidden dangers of manual operation errors are avoided, external interference is reduced, and subsequent channel simulation and test of carrier communication products in a shielding chamber are facilitated.

Specifically, to accurately and comprehensively reflect the communication performance of the practical intelligent power utilization communication system, the channel characteristic simulation operations of the remote wireless communication test and channel simulation subsystem 21 and the local communication test and channel simulation subsystem 23 in the communication channel simulation system need to be well coordinated. Thus, the centralized control computer 26 is adopted in this embodiment to control the operations of the remote wireless communication test and channel simulation subsystem 21 and the local communication test and channel simulation subsystem 23, so that the both are coordinated. Specifically, the centralized control computer 26 determines the channel characteristics of the remote communication channel according to the remote communication channel type adopted by the practical intelligent power utilization communication system, controls the remote wireless communication test and channel simulation subsystem 21 to perform uplink and downlink remote communication channel characteristic influence simulation, determines the channel characteristics of the local communication channel according to the local communication channel type adopted by the practical intelligent power utilization communication system, and controls the local communication test and channel simulation subsystem 23 to perform uplink and downlink local communication channel characteristic influence simulation. The centralized control computer 26 performs centralized control and coordination on the remote wireless communication test and channel simulation subsystem 21 and the local communication test and channel simulation subsystem 23, so that automation and remote control of channel characteristic simulation may be realized, hidden dangers of manual operation errors are avoided, and external interference is reduced.

Figure 5:
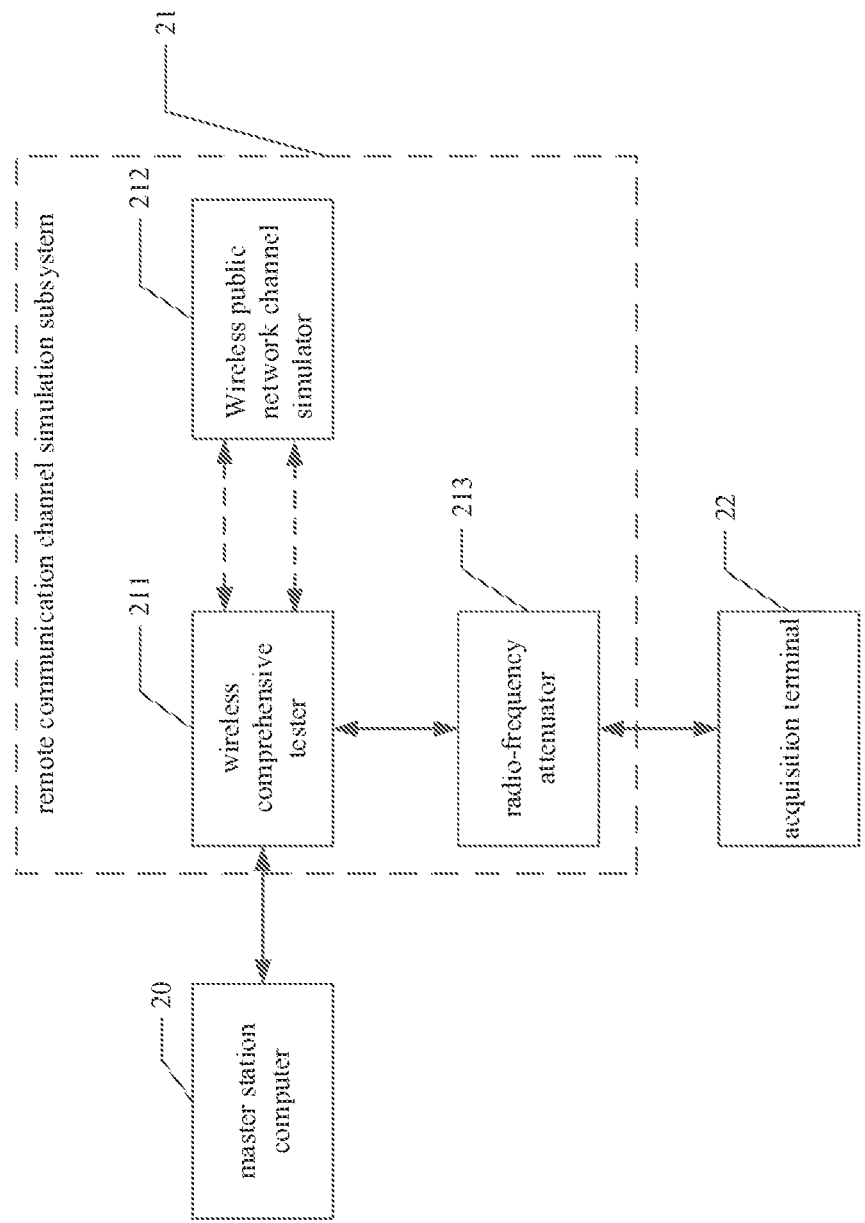
FIG. 5 is a structural diagram of a remote wireless communication test and channel simulation subsystem in the present invention.

As shown in FIG. 5, the remote wireless communication test and channel simulation subsystem 21 in this embodiment preferably includes a wireless comprehensive tester 211, a wireless public network channel simulator 212 and a radio-frequency attenuator 213.

Wherein, the wireless comprehensive tester 211 is connected with the simulation master station 20, the wireless public network channel simulator 212 and the radio-frequency attenuator 213 respectively, and is configured to perform bottom layer protocol processing on signals transmitted by the simulation master station 20 and then transmit the processed signals to the wireless public network channel simulator 212, perform downlink wireless comprehensive test processing on signals returned by the wireless public network channel simulator 212 and then transmit the processed signals to the radio-frequency attenuator 213, perform uplink wireless comprehensive test processing on signals transmitted by the radio-frequency attenuator 213 and then transmit the processed signals to the wireless public network channel simulator 212, perform bottom layer protocol processing on the signals returned by the wireless public network channel simulator 212 and then transmit the processed signals to the simulation master station 20. The wireless comprehensive tester 211 of the present invention adopts an existing wireless comprehensive tester.

The wireless public network channel simulator 212 is connected with the wireless comprehensive tester 211, and is configured to simulate the channel characteristic of the wireless public network communication channel according to a 2G/3G wireless public network channel model, or simulate the channel characteristic of the wireless private network communication channel according to a 230 MHz wireless private network channel model, perform wireless public network communication channel characteristic influence simulation on signals transmitted by the wireless comprehensive tester 211 and then return the signals to the wireless comprehensive tester 211. The simulation technology adopted by the wireless public network channel simulator in the present invention is available in the prior art, so it will not be described in detail herein. However, it should be noted that, the predominant substantial characteristic and significant progress of the present invention lie in that the wireless public network channel simulator is connected with the wireless comprehensive tester to provide simulation signals for detection so as to realize simulation of detection signals.

The radio-frequency attenuator 213 is connected with the wireless comprehensive tester 211 and the detected product 22 respectively, and is configured to simulate the attenuation characteristic of radio-frequency signals and attenuate signals transmitted between the wireless comprehensive tester 211 and the detected product 22.

Figure 6:
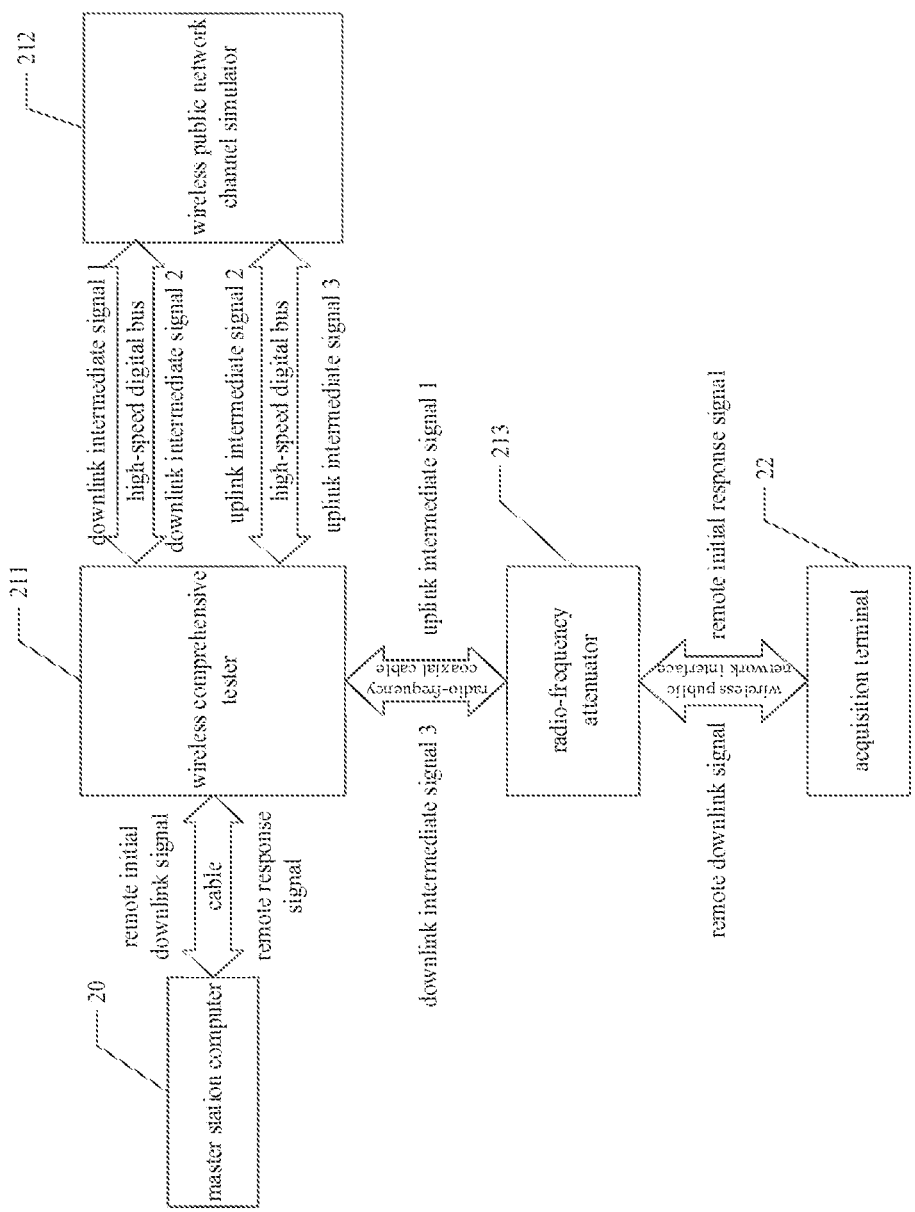
FIG. 6 is a schematic diagram of a signal transmission relation of the remote wireless communication test and channel simulation subsystem in the present invention.

The structure and signal transmission relation of the remote wireless communication test and channel simulation subsystem 21 are as shown in FIG. 6. Specifically, the wireless comprehensive tester 211 is connected with the simulation master station 20 through a cable, connected with the wireless public network channel simulator 212 through a high-speed digital bus and connected with the radio-frequency attenuator 213 through a radio-frequency coaxial cable; and the radio-frequency attenuator 213 is connected with the detected product 22 through a wireless public network interface.

In the downlink, the wireless comprehensive tester 211 receives the remote initial downlink signal transmitted by the simulation master station 20, performs bottom layer protocol processing on the remote initial downlink signal, specifically performs data link layer and physical layer protocol conversion processing to obtain a downlink intermediate signal 1, transmits the downlink intermediate signal 1 to the wireless public network channel simulator 212, receives a downlink intermediate signal 2 returned by the wireless public network channel simulator 212, performs downlink wireless comprehensive test processing on the downlink intermediate signal 2, specifically performs digital-to-analog conversion, coding, modulation, equalization, up-conversion and power amplification processing to obtain a downlink intermediate signal 3, and transmits the downlink intermediate signal 3 to the radio-frequency attenuator 213; and in the uplink, the wireless comprehensive tester 211 receives an uplink intermediate signal 1 returned by the radio-frequency attenuator 213, performs uplink wireless comprehensive test processing on the uplink intermediate signal 1, specifically performs down-conversion, post-equalization, demodulation, decoding and analog-to-digital conversion processing to obtain an uplink intermediate signal 2, transmits the uplink intermediate signal 2 to the wireless public network channel simulator 212, receives an uplink intermediate signal 3 returned by the wireless public network channel simulator 212, performs bottom layer protocol processing on the uplink intermediate signal 3, specifically performs data link layer and physical layer protocol conversion to obtain the remote response signal, and transmits the remote response signal to a master control computer.

The wireless public network channel simulator 212 is configured to simulate the channel characteristics of wireless public network and wireless private network communication channels, e.g. simulate the channel characteristics of communication channels of wireless private networks of CDMA (Code Division Multiple Access), GPRS (General Packet Radio Service), 3G (TD-SCDMA), 230 MHz and the like. Specifically, in the downlink, the wireless public network channel simulator 212 receives the downlink intermediate signal 1 transmitted by the wireless comprehensive tester 211, performs wireless public network communication channel characteristic influence simulation on the downlink intermediate signal 1, specifically performs signal attenuation, multipath superposition, time delay and Doppler phase shift processing to obtain the downlink intermediate signal 2, and returns the downlink intermediate signal 2 to the wireless comprehensive tester 211; and in the uplink, the wireless public network channel simulator 212 receives the uplink intermediate signal 2 transmitted by the wireless comprehensive tester 211, performs wireless public network communication channel characteristic influence simulation on the uplink intermediate signal 2, specifically performs frequency selective attenuation, multipath superposition, time delay, Doppler phase shift and noise processing to obtain the uplink intermediate signal 3, and returns the uplink intermediate signal 3 to the wireless comprehensive tester 211.

In the downlink, the radio-frequency attenuator 213 receives the downlink intermediate signal 3 transmitted by the wireless comprehensive tester 211, attenuates the downlink intermediate signal 3 to obtain the remote downlink signal, and transmits the remote downlink signal to the detected product 22; and in the uplink, the radio-frequency attenuator 213 receives the remote initial response signal transmitted by the detected product 22, attenuates the remote initial response signal to obtain the uplink intermediate signal 1, and transmits the uplink intermediate signal 1 to the wireless comprehensive tester 211.

Figure 7:
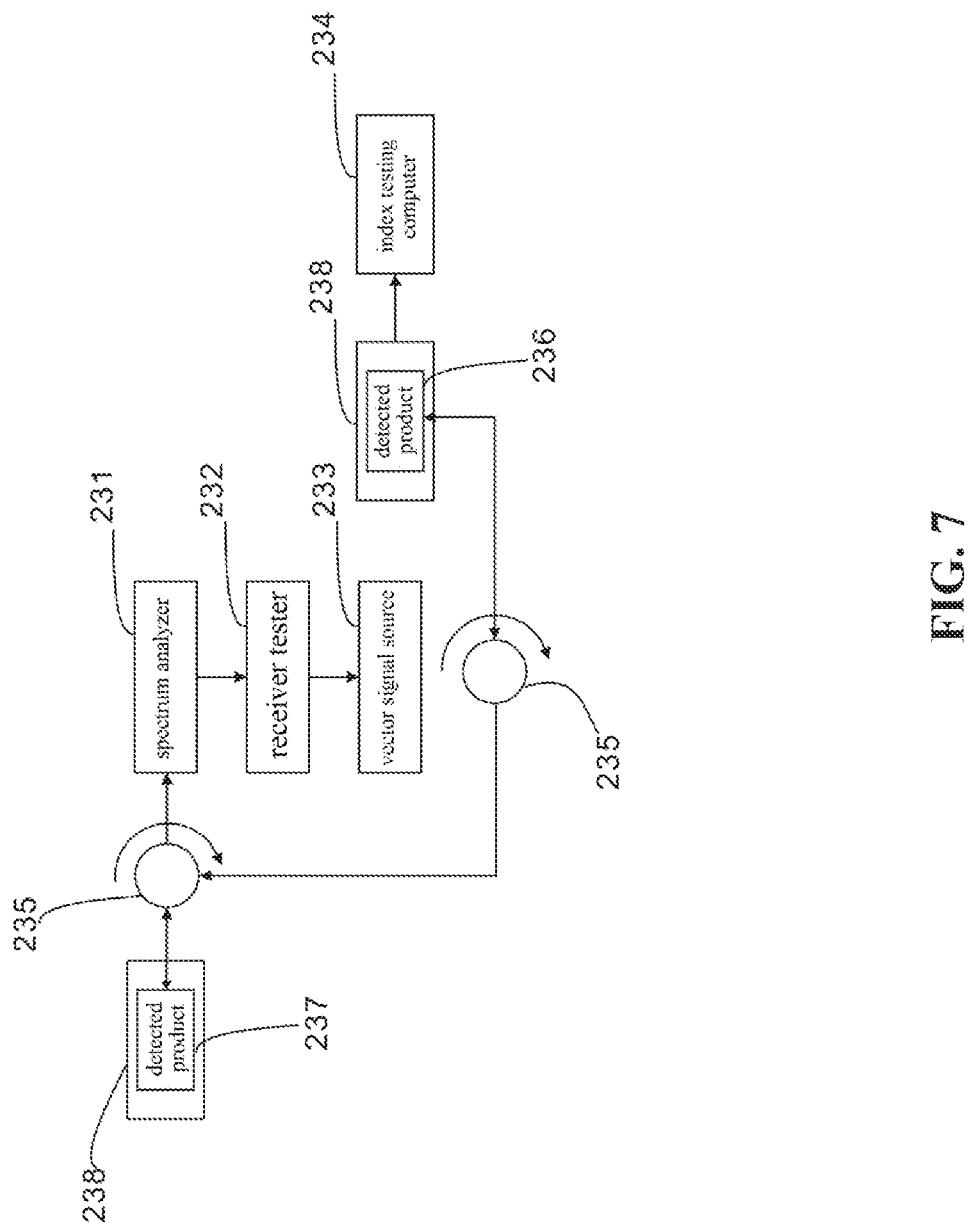
FIG. 7 is a structural schematic diagram of a short-distance wireless communication channel simulation secondary subsystem in the present invention.
Figure 8:
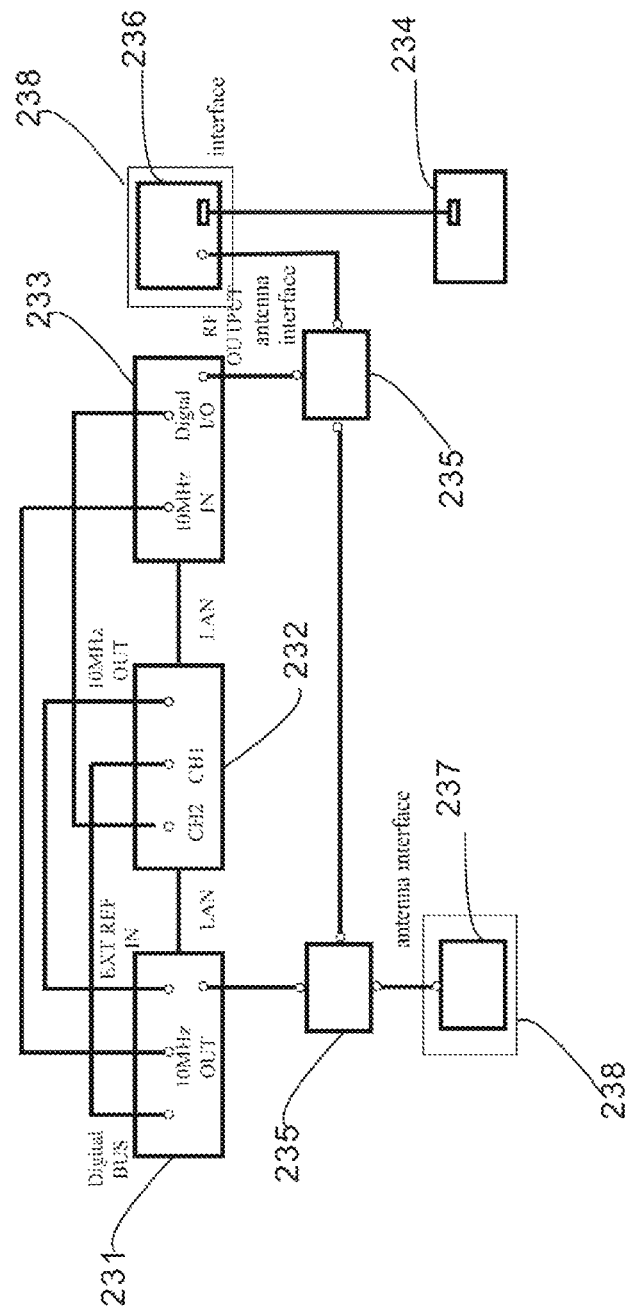
FIG. 8 is a structural schematic diagram of a short-distance wireless communication channel simulation secondary subsystem in the present invention.

The local communication test and channel simulation subsystem 23 in this embodiment specifically includes a short-distance wireless communication channel simulation secondary subsystem as shown in FIG. 7 and FIG. 8, and a low-voltage power line carrier communication channel simulation secondary subsystem as shown in FIG. 9 to FIG. 18.

As shown in FIG. 7, the short-distance wireless communication channel simulation secondary subsystem specifically includes a spectrum analyzer, a receiver tester, a vector signal source, circulators, a shielding box and an index testing computer, wherein the working principle of the spectrum analyzer 231 serving as a radio-frequency input of the attenuation simulation of the whole system is equivalent to a super-heterodyne receiver, and the spectrum analyzer 231 has the basic functions of down-converting tested signals into intermediate frequency signals through internal local oscillation and analyzing the intermediate frequency signals on an intermediate frequency to obtain amplitude and spectrum. Preferably, an Agilent N9020A MXA spectrum analyzer is adopted in the present invention. The receiver tester 232 is configured to digitally process the intermediate frequency signals input by the spectrum analyzer, perform attenuation simulation on the digital signals and set different channel parameter values according to different channel characteristics of different application environments. The receiver tester 232 may set the channel parameters according to actually-measured or theoretically-analyzed constructed models of power utilization district channels of countryside, towns, large cities and the like to complete the setting of other specific parameters including attenuation value, multipath parameter, phase, noise and environment, establish a preset channel model and simulate the attenuation characteristic when the tested signals pass through different districts. Preferably, N5106A PXB is adopted in the present invention. The vector signal source 233 is configured to up-convert the signals simulated by the receiver tester, convert the intermediate frequency signals to the frequency of the originally input radio-frequency signals and set the attenuation value of the signals in the whole simulation process at the same time. Then, the signals output by the vector signal source are radio-frequency signals simulated by a preset district channel. An E4438C vector signal source is adopted. The index testing computer 234 is configured to control signal transmission, test the received signals and directly transmit the signals up-converted by the vector signal source to the index testing computer for test and analysis, including test of reading success rate, monitoring of serial port data and test of communication protocols, and may be connected with an oscilloscope, the spectrum analyzer and the like to test other indexes such as receiving sensitivity to signals and acceptable frequency offset.

The circulators 235 realize a one-way clockwise path through attenuation isolation between interfaces, and are configured to isolate a transmitting link and a receiving link of the whole system, so that the whole system forms a two-way link. The wireless public network test only requires testing a terminal product, so the test direction is a one-way link; and for a micro-power wireless communication mode, both a transmitting end and a receiving end have corresponding test indexes, so a two-way link needs to be simulated. The connection of the circulators does not change the characteristics of signals, so the original signal characteristics are kept when the input or output signals pass through the circulators; and fixed decrement exists only between the interfaces, signals are subjected to certain attenuation when being transmitted between the interfaces, but the attenuation value of the signals is smaller compared with the attenuation of a practical channel environment and may be ignored, and if the attenuation value needs to be accurately calculated, channel parameters may be corrected when a channel is set. Each of the two circulators in this embodiment adopts three interfaces (one circulator is on the spectrum analyzer side, the other circulator is on the vector signal source side, and the direction of one-way conducted signals of the circulators is marked in FIG. 7), and due to the one-way clockwise conductivity of the circulators, the three interfaces need to be respectively connected with input and output equipment and the detected products according to the conducting direction, so as to satisfy respective isolation of the receiving and transmitting links. The connection relations between the circulators and the products and between the circulators and test equipment may be established by adopting radio-frequency feeder lines, and connection establishment may be aided by different adapters or other connectors if the interfaces are different. The circulators meeting the test band range and the power requirement may be connected to the system. The shielding box 238 is configured to avoid bleeding of signals transmitted and received by the detected products and shield isolating signals, so that inaccurate test is avoided, and it may be considered that the signals are received and transmitted only through specified links.

FIG. 8 is a connection diagram of the system shown in FIG. 7. The spectrum analyzer 1, the receiver tester 232, a digital bus of a rear panel of the vector signal source 233 and input and output 10 MHz reference signals are connected as shown in the figure by adopting specifically-configured connecting lines, all the devices may be connected to the same switch due to insufficient interfaces of an LAN between the devices, and an IP address is set for each device. The circulators 235 and a meter module 237 (the meter module may be installed in the electric energy meter or on a debugging board of a corresponding product and is controlled by a computer, and an acquisition terminal module is arranged on the debugging board) are connected by radio-frequency feeder lines. The acquisition terminal module 236 and the meter module 237 are put into the shielding box and electrified, and the acquisition terminal module may be supplied with power by a USB port of the computer through a test board. The acquisition terminal module and the meter module in the figure are detected products 236 and 237.

After the system is established, the parameters of the receiver tester 232, the spectrum analyzer 231 and a signal generator 233 are set according to test requirements, and the acquisition terminal module 236 is controlled by computer software to transmit a command. Signal analysis software, the spectrum analyzer and the oscilloscope may be utilized to observe and analyze signals and test the indexes of a product.

The circulators are connected to this system based on an original simulation system, so that the function of transmitting the command from the receiving end to the transmitting end is established; the product is arranged in the shielding box, so that the influence of external factors on the product may be eliminated, and the performance detection result of the product is more credible; and the communication results are statistically analyzed through the computer software, so that the detection flow is stricter.

The low-voltage power line carrier communication channel simulation secondary subsystem specifically includes a low-voltage distribution network channel characteristic simulation device, an acquisition terminal carrier module interface card device, an electric energy meter carrier module interface card device and a centralized control computer; wherein The low-voltage distribution network channel characteristic simulation device is connected with the purification power supply subsystem, and is configured to simulate low-voltage distribution network channel characteristics including noise characteristic, transmission impedance characteristic, loss attenuation characteristic, multipath transmission interference characteristic and load impedance characteristic of signals output by the purification power supply subsystem; the acquisition terminal carrier module interface card device is connected with the purification power supply subsystem and the low-voltage distribution network channel characteristic simulation device, and is configured to provide electric energy and communication connection for the communication devices connected with the acquisition terminal carrier module interface card device; the electric energy meter carrier module interface card device is connected with the purification power supply subsystem and the low-voltage distribution network channel characteristic simulation device, and is configured to provide electric energy and communication connection for an electric energy meter connected with the electric energy meter carrier module interface card device; and the centralized control computer is connected with the low-voltage distribution network channel characteristic simulation device, the acquisition terminal carrier module interface card device and the electric energy meter carrier module interface card device, and is configured to communicate with the acquisition terminal carrier module interface card device to test the communication devices, communicate with the electric energy meter carrier module interface card device to test the electric energy meter and control low-voltage distribution network channel characteristic simulation of the low-voltage distribution network channel characteristic simulation device.

In view of the defects that the existing low-voltage carrier communication simulation technology is complex to implement and expensive in manufacturing cost and may not accurately and comprehensively simulate the basic characteristics of a power line carrier communication channel so as not to test a low-voltage power carrier communication device, the embodiment of the present invention provides a test system for the low-voltage power carrier communication device, which is used for simulating multiple channel characteristic indexes when a low-voltage distribution network is used as a communication medium, so that the low-voltage power carrier communication device may be comprehensively detected. The present invention will be described in detail below in combination with the accompanying drawings.

Figure 9:
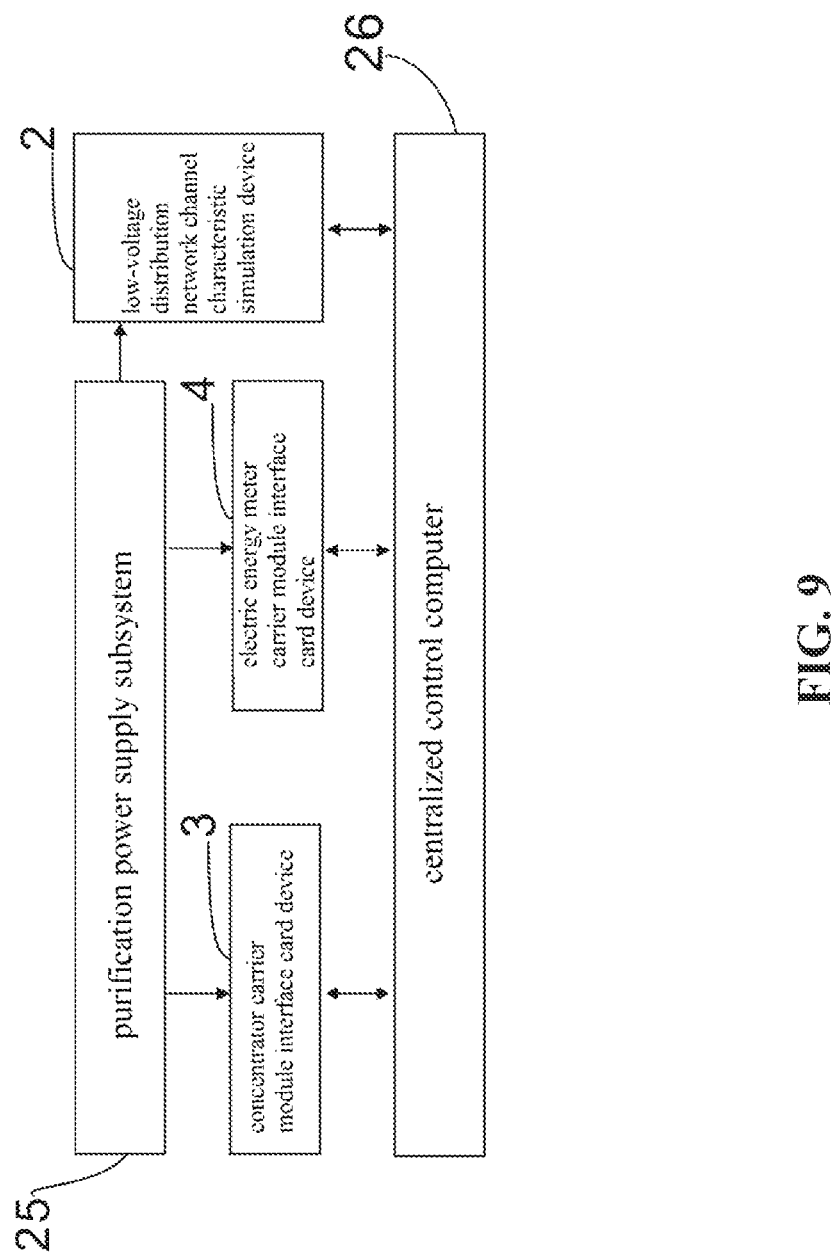
FIG. 9 is a structural schematic diagram of a low-voltage power line carrier communication channel simulation secondary subsystem in the present invention.

The low-voltage power line carrier communication channel simulation secondary subsystem provided by the embodiment of the present invention, as shown in FIG. 9, includes a low-voltage distribution network channel characteristic simulation device 2, an acquisition terminal carrier module interface card device 3, an electric energy meter carrier module interface card device 4 and a centralized control computer 26. The low-voltage power line carrier communication channel simulation secondary subsystem is connected with the purification power supply subsystem 25, and the purification power supply subsystem 25 is configured to provide electric energy and matched impedance for the interior of the system, isolate interference noise and isolate carrier signals between the acquisition terminal carrier module interface card device 3 and the electric energy meter carrier module interface card device 4.

The low-voltage distribution network channel characteristic simulation device 2 is connected with the purification power supply subsystem 25, and is configured to simulate low-voltage distribution network channel characteristics including noise characteristic, transmission impedance characteristic, loss attenuation characteristic, multipath transmission interference characteristic and load impedance characteristic of signals output by the purification power supply subsystem.

The acquisition terminal carrier module interface card device 3 is connected with the purification power supply subsystem 25 and the low-voltage distribution network channel characteristic simulation device 2, and is configured to provide electric energy and communication connection for the communication devices connected with the acquisition terminal carrier module interface card device.

The electric energy meter carrier module interface card device 4 is connected with the purification power supply subsystem 25 and the low-voltage distribution network channel characteristic simulation device 2, and is configured to provide electric energy and communication connection for an electric energy meter connected with the electric energy meter carrier module interface card device.

The centralized control computer 26 is connected with the low-voltage distribution network channel characteristic simulation device 2, the acquisition terminal carrier module interface card device and the electric energy meter carrier module interface card device, and is configured to communicate with the acquisition terminal carrier module interface card device to test the communication devices, communicate with the electric energy meter carrier module interface card device to test the electric energy meter and control low-voltage distribution network channel characteristic simulation of the low-voltage distribution network channel characteristic simulation device.

It could be known from the above descriptions that, the centralized control computer controls the low-voltage distribution network channel characteristic simulation device, so that main channel characteristics of the low-voltage distribution network are simulated; the purification power supply subsystem provides a good working environment for the whole test system, so that the influence of external power supply noise on the test results is reduced; and compared with the prior art, the embodiment of the present invention may accurately and comprehensively simulate the basic characteristics of the power line carrier communication channel, then may comprehensively test the low-voltage power carrier communication device and is simple in implementation and low in cost.

Figure 10:
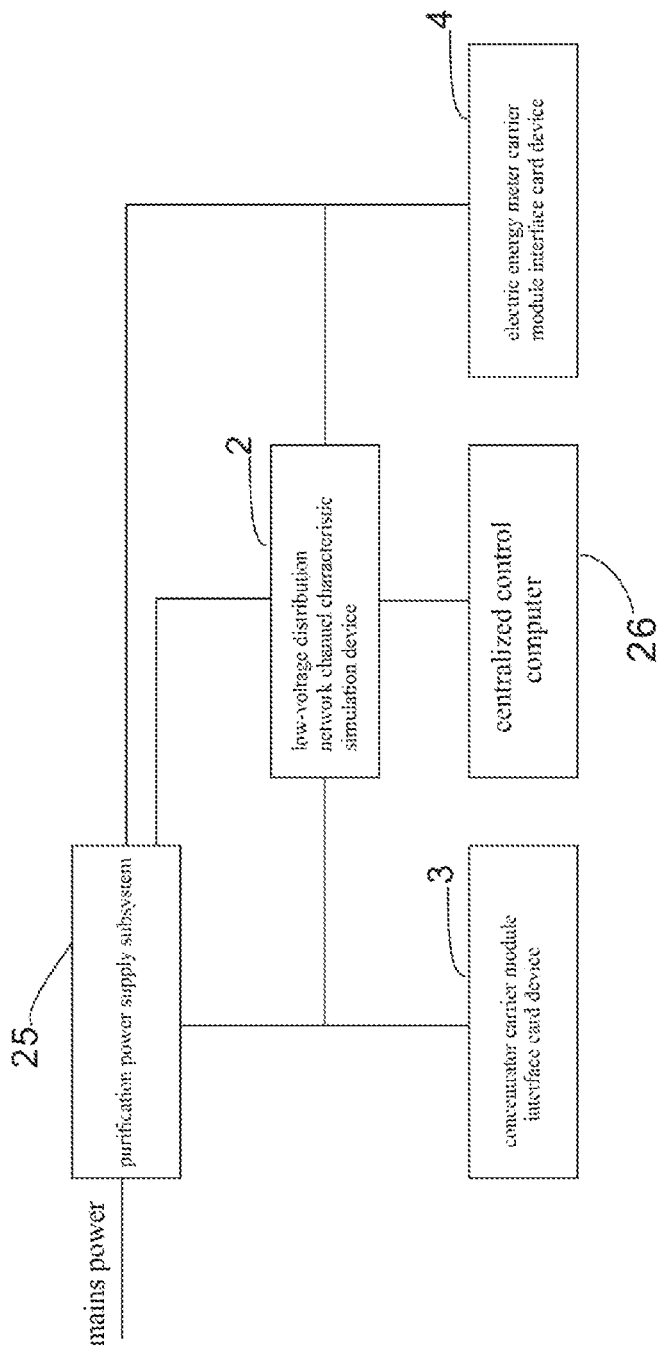
FIG. 10 is a structural schematic diagram of a low-voltage power line carrier communication channel simulation secondary subsystem in the present invention.

Further, as shown in FIG. 10, in the low-voltage power line carrier communication channel simulation secondary subsystem, the purification power supply subsystem 25 provides stable and clean electric energy supply, isolates external noise interference and stabilizes internal impedance of the simulation system.

The low-voltage distribution network channel characteristic simulation device 2 of the low-voltage power line carrier communication channel simulation secondary subsystem completes simulation of the main channel characteristics of the low-voltage distribution network, including noise characteristic, transmission line impedance characteristic, load impedance characteristic, multipath attenuation characteristic and line loss characteristic; the acquisition terminal carrier module interface card device 3 takes charge of physically connecting a detected acquisition terminal carrier module and providing power and carrier communication connection for the detected acquisition terminal carrier module; and the electric energy meter carrier module interface card device 4 takes charge of physically connecting a detected electric energy meter carrier module and providing power and carrier communication connection for the detected electric energy meter carrier module.

The centralized control computer 26 is in communication connection with the acquisition terminal carrier module interface card device 3 and the electric energy meter carrier module interface card device 4 through 485 communication signal lines, and is configured to transmit test messages to the detected acquisition terminal carrier module and the detected electric energy meter carrier module respectively and receive a communication message returned by the detected acquisition terminal carrier module or the detected electric energy meter carrier module to verify whether the communication succeeds. In addition, the centralized control computer 26 is further configured to control the simulation of various characteristics in the low-voltage distribution network channel characteristic simulation device 2.

Through the low-voltage power line carrier communication channel simulation secondary subsystem in the embodiment of the present invention, the simulation of multiple channel characteristic indexes when the low-voltage distribution network is used as a communication medium may be realized, the range of the simulated channel index band of the low-voltage distribution network is 10-500 kHz, and the channel environment simulation functions of the low-voltage distribution network, including noise characteristic simulation, transmission line impedance characteristic simulation, load impedance characteristic simulation, network multipath attenuation characteristic simulation and signal line loss characteristic simulation, may be realized, so that indexes including transmitting performance, transceiving success rate, receiving success rate, receiving sensitivity, attenuation resistance, noise resistance, impedance adaptability and the like of the low-voltage power carrier communication device may be quantitatively tested.

Figure 11:
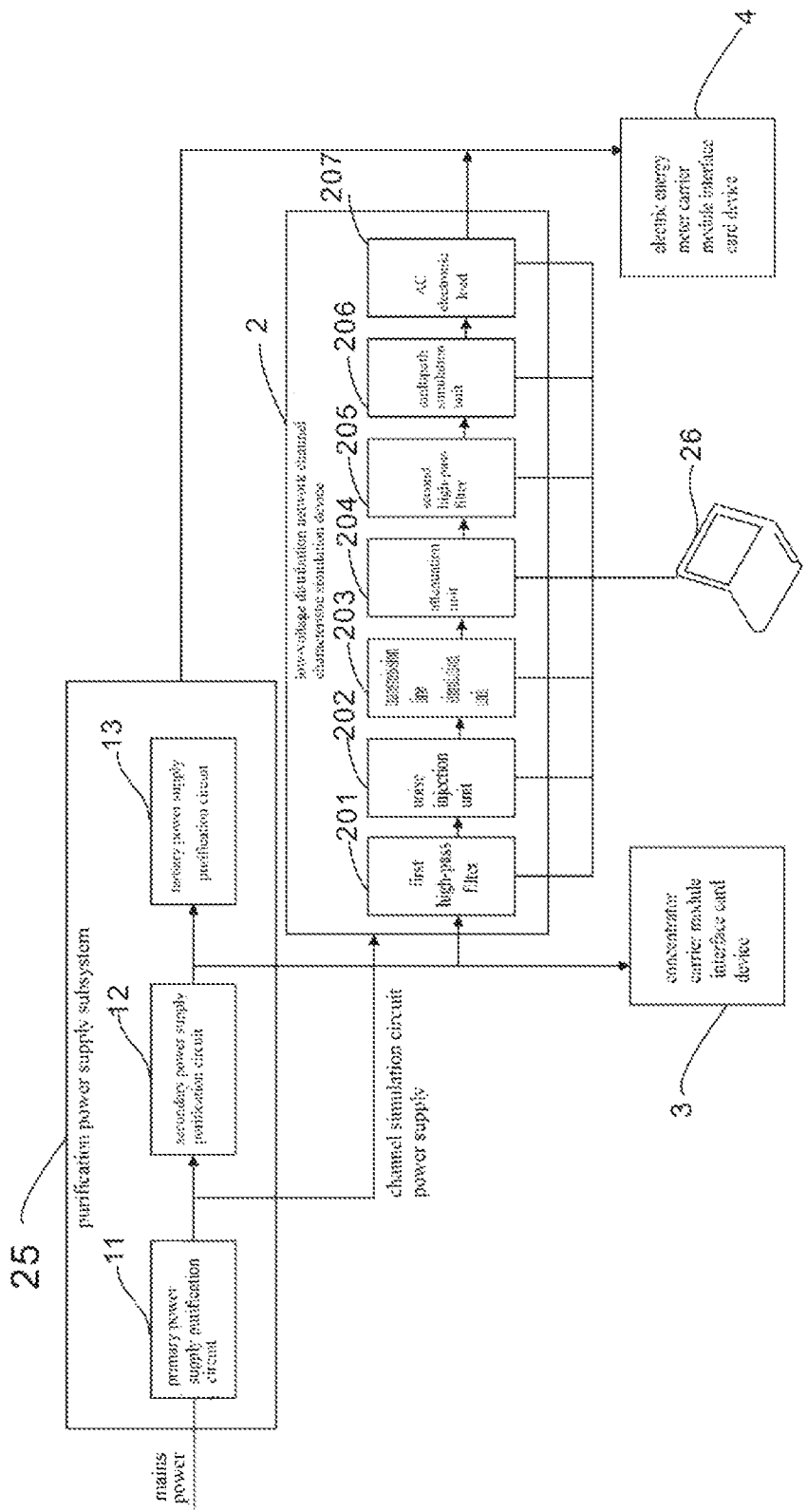
FIG. 11 is a structural schematic diagram of a low-voltage power line carrier communication channel simulation secondary subsystem in the present invention.

FIG. 11 is a detailed structural block diagram based on the low-voltage power line carrier communication channel simulation secondary subsystem of FIG. 10. Each of the above devices will be described in detail below in combination with the structure shown in FIG. 11.

(1) Low-Voltage Distribution Network Channel Characteristic Simulation Device 2.

As shown in FIG. 11, the low-voltage distribution network channel characteristic simulation device 2 includes: a first high-pass filter 201, configured to filter power-frequency electric energy signals output by a secondary power supply purification circuit to obtain high-frequency carrier communication signals; a noise injection unit 202, configured to inject noise to the high-frequency carrier communication signals output by the first high-pass filter; a transmission line simulation unit 203, configured to perform transmission impedance simulation of a power line on the signals output by the noise injection unit; an attenuation unit 204, configured to perform loss attenuation simulation on the signals output by the transmission line simulation unit; a second high-pass filter 205, configured to superpose the signals output by the attenuation unit and power-frequency electric energy signals (e.g. 220V power-frequency signals)

output by a tertiary isolating power supply circuit to obtain superposed signals and then output the superposed signals; a multipath simulation unit 206, configured to perform multipath transmission interference simulation on the superposed signals output by the second high-pass filter; and an AC electronic load 207, configured to perform load impedance simulation on the signals output by the multipath simulation unit.

To further understand the low-voltage distribution network channel characteristic simulation device 2, each of the above units will be described below.

Figure 12:
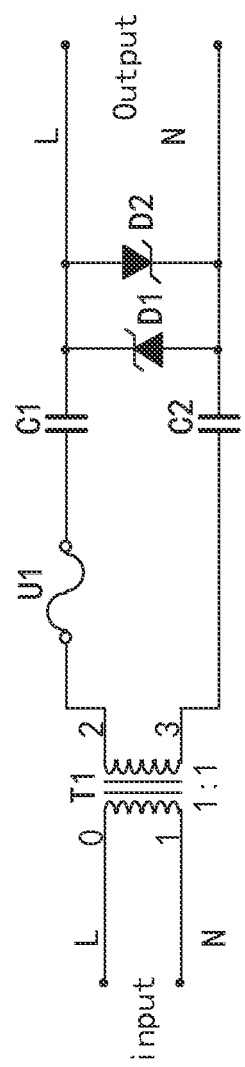
FIG. 12 is a schematic diagram of a circuit structure of a first high-pass filter and a second high-pass filter in the present invention.

FIG. 12 is a circuit schematic diagram of the first high-pass filter 201 and the second high-pass filter 205. As shown in FIG. 12, a mutual inductor T1 and capacitors C1 and C2 form a high-pass filter loop; a fuse U1 is used for ensuring that current meets the requirement; and voltage stabilizing diodes D1 and D2 are used for providing overvoltage protection. The power-frequency electric energy signals may be filtered through the first high-pass filter 201, so that carrier signals may be extracted; and the high-frequency carrier communication signals output by the attenuation unit may be coupled back to a 220V power-frequency power line through the second high-pass filter 205.

Figure 13:
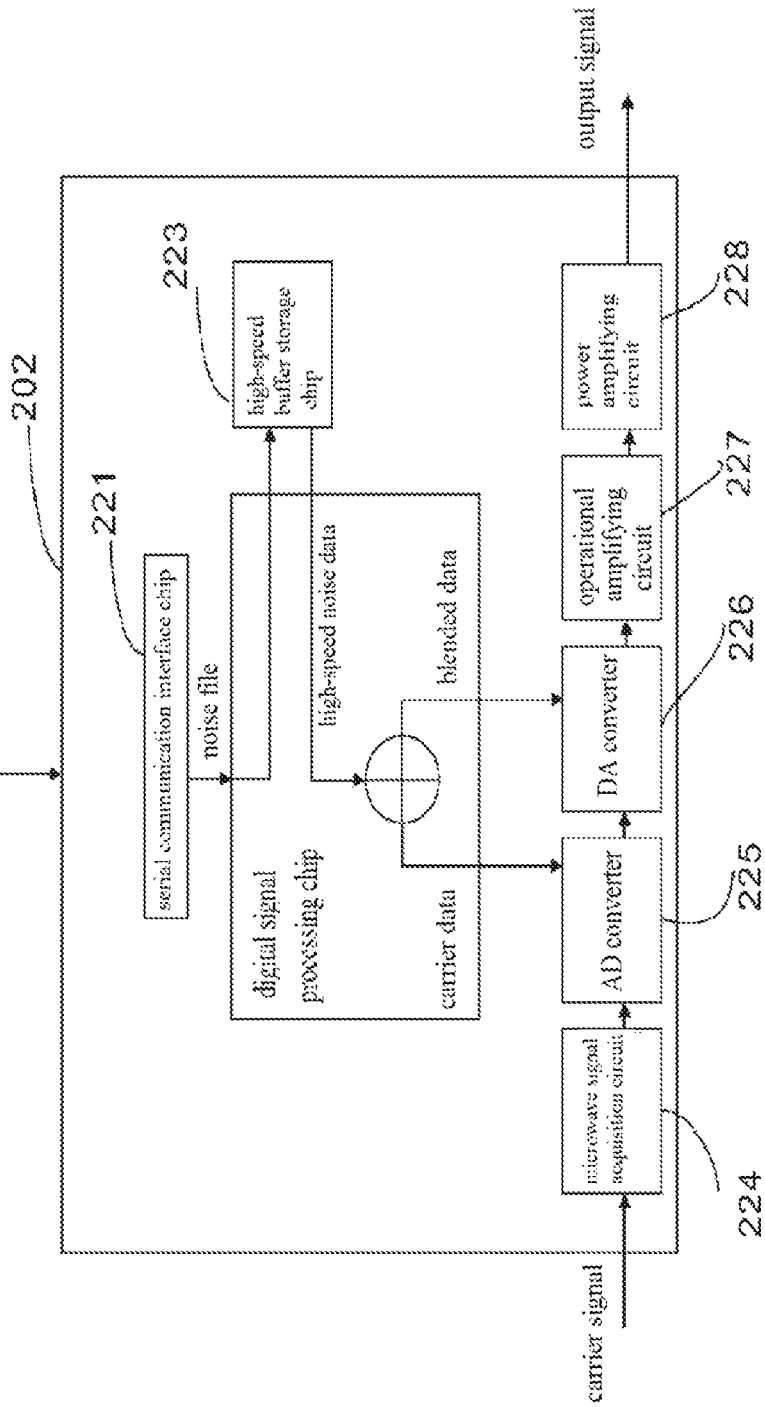
FIG. 13 is a structural schematic diagram of a noise injection unit in the present invention.

FIG. 13 is a structural schematic diagram of the noise injection unit 202 or a specific structural block diagram of a digital integrated noise simulation unit. As shown in FIG. 13, the noise injection unit 202 includes a serial communication interface chip 221, a digital signal processing chip 222, a high-speed buffer storage chip 223, a carrier signal acquisition circuit 224, an AD converter 225, a DA converter 226, an operational amplifying circuit 227 and a power amplifying circuit 228.

The working principle of the noise injection unit 202 is as follows: the serial communication interface chip 221 acquires a noise file from the centralized control computer; the carrier signal acquisition circuit 224 receives high-frequency carrier communication signals from the first high-pass filter 201, and outputs the high-frequency carrier communication signals to the AD converter 225; the digital signal processing chip 222 stores the noise file in the high-speed buffer storage chip 223, acquires noise data from the high-speed buffer storage chip, digitally superposes the noise data and carrier data output by the AD converter 225 to form blended data blended with noise signals and carrier signals, and outputs the blended data to the DA converter 226; then, the operational amplifying circuit 227 performs voltage amplification of signals on the data output by the DA converter 226; and later, the power amplifying circuit 228 amplifies the power of the signals output by the operational amplifying circuit 227, so as to complete a noise injection process.

Specifically, the serial communication interface chip 221 is configured to acquire the noise file from the centralized control computer 26; the acquired noise file is stored in the high-speed buffer storage chip 223 through a transmission path data channel of the digital signal processing chip 222; when noise needs to be injected to carrier signals, the digital signal processing chip 222 reads high-speed noise data from the high-speed buffer storage chip 223 at the data rate of 30 Msps, digitally superposes the noise data and the carrier data input by the AD converter 225 to form blended output signals blended with noise signals and carrier signals, and outputs the blended output signals to the DA converter 226; the carrier signal acquisition circuit 224 acquires signals of a carrier band from the first high-pass filter 201, and injects the signals to the AD converter 225 to convert simulation signals into digital signals; the DA converter 226 converts digital signals into simulation signals; later, the blended simulation signals are transmitted to the operational amplifying circuit 227 for amplifying the voltage of the signals; and finally, the signals are input to the power amplifying circuit 228 for amplifying power, thus the injection process of channel noise is completed.

The above noise superposition process may be based on the following formula:

$$s(i)=A\cdot n(i-M)+p(i) \quad i=1\ldots N$$

wherein, s(i) expresses blended output signals, p(i) expresses carrier data, the data length is N, n(i) expresses high-speed noise data, M expresses noise delay point, and A expresses noise amplitude weight.

The noise waveform file is acquired from the centralized control computer 26 by the noise injection unit 202 and converted into simulation signals, and the simulation signals are finally injected to a carrier communication channel, so that a noise simulation process is completed. Compared with a separated instrument type noise simulation system in the prior art, the noise injection unit in the embodiment of the present invention is obviously small in size, may simulate multiple kinds of noise and is simple in operation and low in equipment manufacturing cost.

In the specific implementation process, the transmission line simulation unit 203 may be an RLC array for simulating the transmission line impedance change condition of the low-voltage distribution network. In this embodiment, for the design of the RLC array, reference may be made to the design of a transmission line model, and specifically, the RLC array may be designed according to the following non-uniform transmission line model formula:

$$-\frac{\partial u}{\partial x} = R(v)i + L(v)\frac{\partial i}{\partial t}$$
$$-\frac{\partial i}{\partial x} = G(v)i + C(v)\frac{\partial u}{\partial t}$$

in the formula, R(v), L(v), G(v) and C(v) are respectively resistance, inductance, conductivity and capacitance of a conducting wire. v is a generic term of change factors of impedance characteristics, and the formula is called as a v-type non-uniform transmission line equation.

Figure 14:
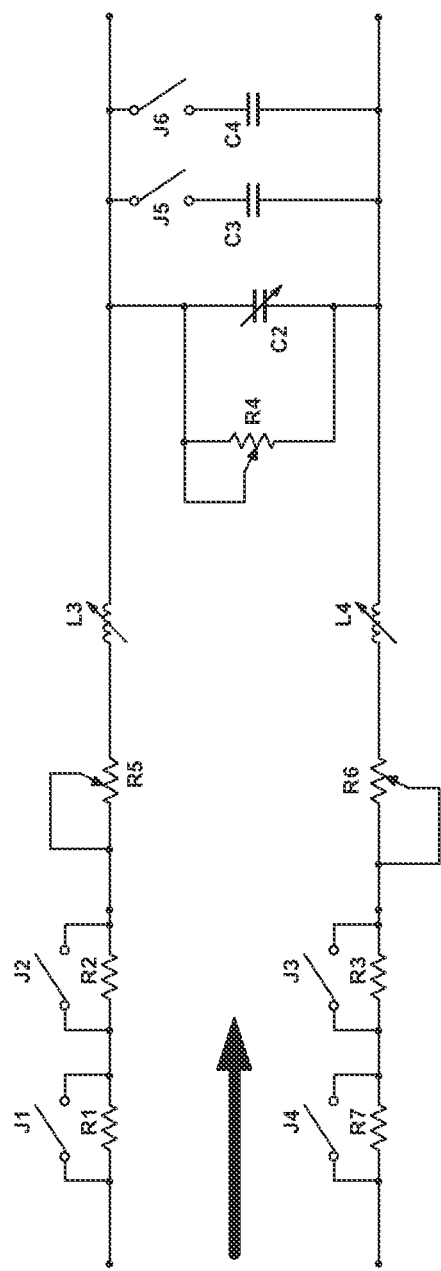
FIG. 14 is a circuit diagram of an RLC array in the present invention.

FIG. 14 is a circuit diagram of the RLC array. Resistors R1, R2, R3 and R7 are used for roughly adjusting the series impedance condition of a transmission line and controlled by switches J1, J2, J3 and J4, sliding varistors R5 and R6 are used for finely adjusting the series impedance condition; sliding varindors L3 and L4 are used for adjusting the series inductive reactance of the transmission line; a sliding varistor R4 is used for finely adjusting the parallel impedance condition; and a sliding varactor C2 is used for finely adjusting the capacitive reactance of the transmission line, and capacitors C3 and C4 are used for roughly adjusting the capacitive reactance of the transmission line.

The attenuation unit 204 may be used for simulating the transmission loss of a low-voltage power line, and preferably, may be formed by interconnecting an Agilent 8494G programmable attenuator, an Agilent 8496G programmable attenuator, an Agilent 11713C attenuator driver and an Agilent 11716 attenuator.

Figure 15:
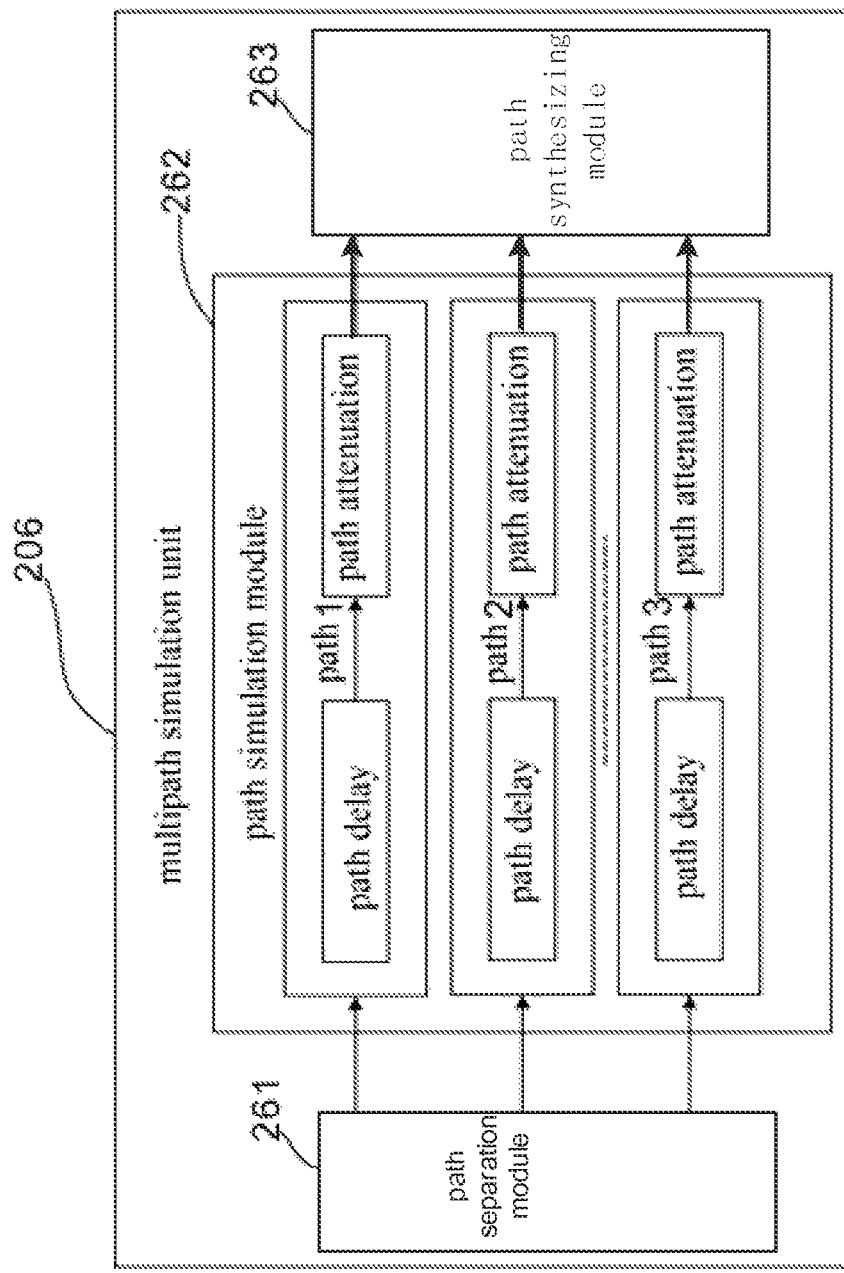
FIG. 15 is a structural block diagram of a multipath simulation unit in the present invention.

FIG. 15 is a structural block diagram of the multipath simulation unit 206. As shown in FIG. 15, the multipath simulation unit 206 includes: a path separation module 261, configured to decompose carrier signals output by the second high-pass filter to multiple transmission paths; a path simulation module 262, configured to perform delay operation and attenuation operation on the carrier signals on each transmission path; and a path synthesizing module 263, configured to synthesize the carrier signals output by each transmission path.

Specifically, the simulation process of the multipath transmission characteristic is as follows: the path separation module 261 decomposes input signals to n different transmission paths, the path simulation module 262 performs delay and attenuation processing on the signals on each transmission path, and the path synthesizing module 263 synthesizes the signals output by the n paths into total output signals, thus completing the simulation process of the multipath transmission characteristic.

The AC electronic load 207 is configured to simulate the load impedance characteristic of the low-voltage distribution network. The AC electronic load is a device capable of simulating the load (e.g. a household appliance) characteristic in the real environment, and is generally used for detecting the connectivity of a power supply. The principle of the AC electronic load lies in that: the conduction quantity (quantity duty ratio) of an internal power MOSFET or transistor is controlled, and the electric energy is consumed by means of loss power of the power transistor. The AC electronic load may be used for accurately detecting the voltage of a load, accurately adjusting the current of the load, simulating the short circuit of the load, simulating the inductive, resistive and capacitive change of the load and adjusting the current rise time of the capacitive load.

In the specific implementation process, the low-voltage distribution network channel characteristic simulation device further includes a high-pass decoupling module and a low-pass transformer, wherein the high-pass decoupling module is configured to extract the carrier signals output by the second high-pass filter, and the low-pass transformer is configured to reduce the voltage of predetermined power-frequency signals (e.g. 220V power-frequency signals) to a predetermined voltage which is preset by the system. In specific implementation, after the output signals of the high-pass decoupling module are connected in series with the output signals of the low-pass transformer, the series output signals are connected to the AC electronic load 207, and the AC electronic load 207 provides impedance changes of different frequency points.

Specifically, when the AC electronic load is adopted and the impedance change of large value is simulated, the AC electronic load may be directly connected to a 220V power line loop; and when the impedance change of small value is simulated, at least 10 Vac of AC bias voltage needs to be provided to the AC electronic load, but very high bias voltage should not be provided, otherwise, the impedance range of the AC electronic load is affected. Therefore, the input 220V voltage needs to be transformed into 11V by the low-pass transformer, then the 11V voltage is output to the AC electronic load as the AC bias voltage, and the carrier signals are separately extracted by using the high-pass decoupling module and output to the AC load for simulating the impedance.

Figure 16:
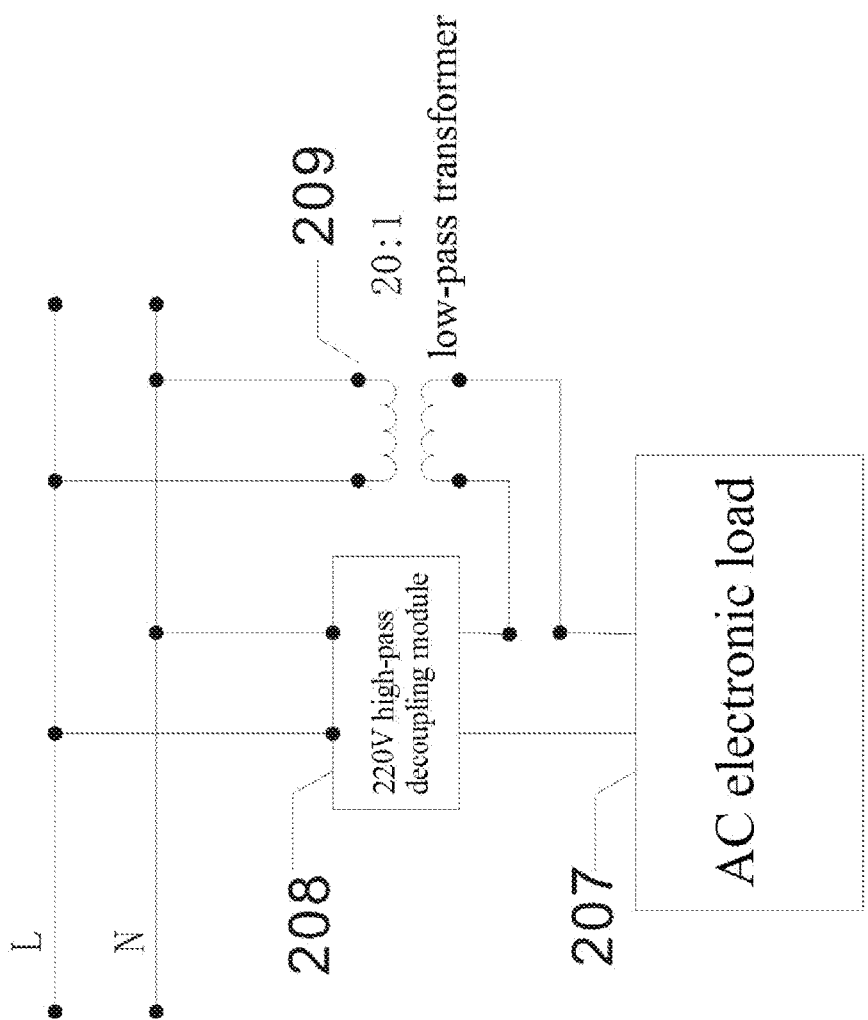
FIG. 16 is a connection schematic diagram of an AC electronic load in the present invention.

FIG. 16 is a connection schematic diagram of the AC electronic load 207. As shown in FIG. 16, the 220V high-pass decoupling module 208 is configured to extract the carrier signals output by the second high-pass filter on a power line; the 20:1 low-pass transformer 209 is configured to reduce the voltage of 220V power-frequency signals to 11V; and after the output signals of the 220V high-pass decoupling module 208 are connected in series with the output signals of the 20:1 low-pass transformer 209, the series output signals are connected to the AC electronic load 207, and the AC electronic load 207 simulates impedance changes of different frequency points.

It could be known from the above descriptions that, the low-voltage distribution network noise characteristic simulation device of this embodiment has the beneficial effects: (1) the noise condition of the practical operating environment may be vividly simulated by adopting the field noise playback technology based on a large-capacity storage module; (2) the transmission impedance of the power line is simulated by using the RLC array, and the practical power utilization load is simulated by using the active electronic load device, so that the dynamic range is large and the variability of the simulated spectral characteristics is strong; and (3) multipath attenuation and line loss attenuation characteristics of the low-voltage distribution network are simulated by adopting a multipath attenuation simulation circuit based on an embedded path matrix calculation unit, so that a large number of paths may be simulated, and the variability of path parameters is strong.

(2) Acquisition Terminal Carrier Module Interface Card Device 3

Figure 17:
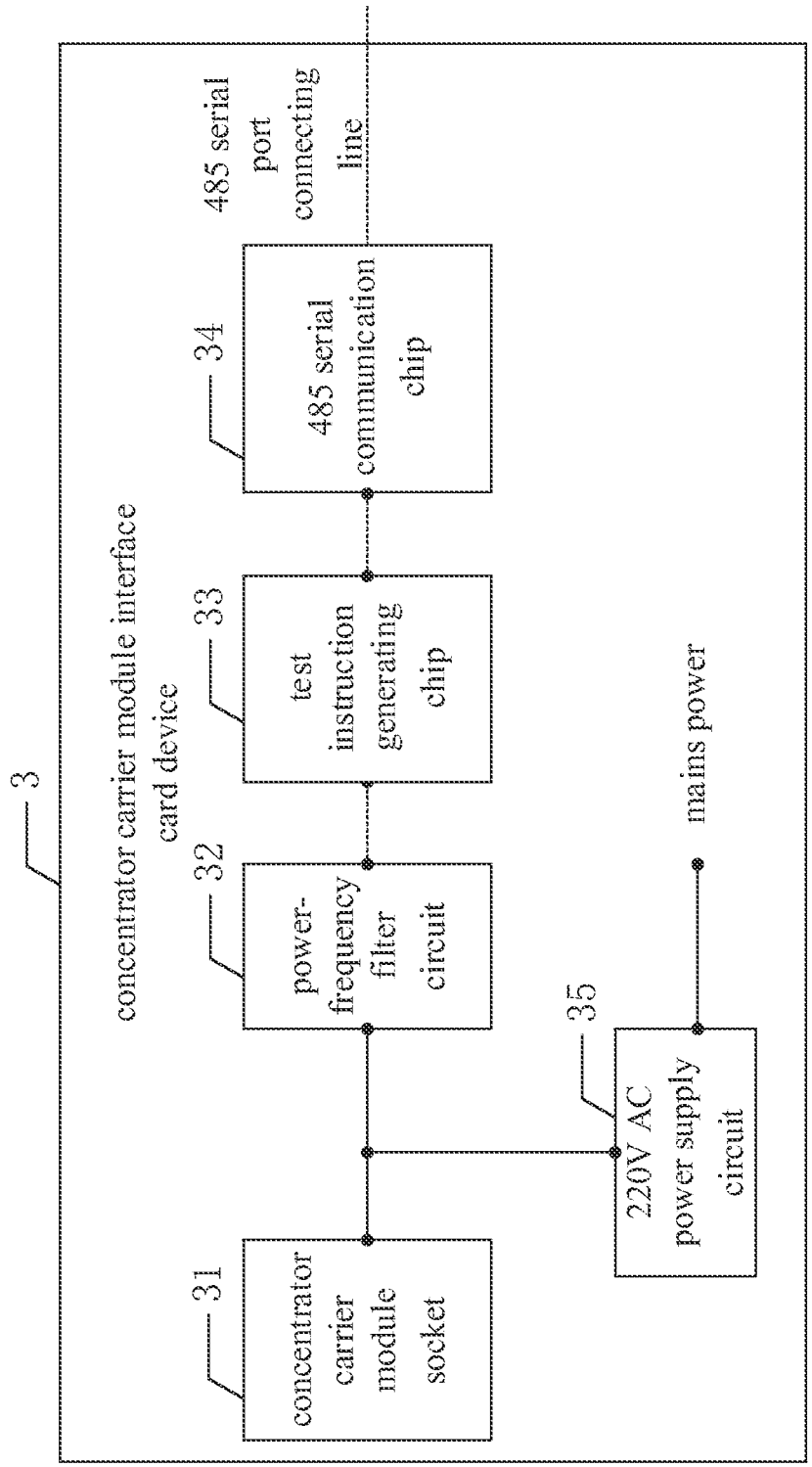
FIG. 17 is a structural block diagram of an acquisition terminal carrier module interface card device in the present invention.

FIG. 17 is a structural block diagram of the acquisition terminal carrier module interface card device 3. As shown in FIG. 17, the acquisition terminal carrier module interface card device 3 includes an acquisition terminal carrier module socket 31, a power-frequency filter circuit 32, a test instruction generating chip 33, a 485 serial communication chip 34 and a 220V AC power supply circuit 35, wherein the acquisition terminal carrier module socket 31 is connected with an acquisition terminal carrier communication module in a physical and circuit connection manner; the power-frequency filter circuit 32 is configured to filter 50 Hz power-frequency signals to extract carrier signals and transmit the carrier signals to the test instruction generating chip 33; the test instruction generating chip 33 is configured to randomly generate a test instruction and transmit the instruction to the acquisition terminal carrier communication module; the 485 serial communication chip 34 is configured to implement two-way communication with the centralized control computer 26; and the 220V AC power supply circuit 35 is configured to provide electric energy for the circuits on the acquisition terminal carrier module interface card device 3.

(3) Electric Energy Meter Carrier Module Interface Card Device 4

Figure 18:
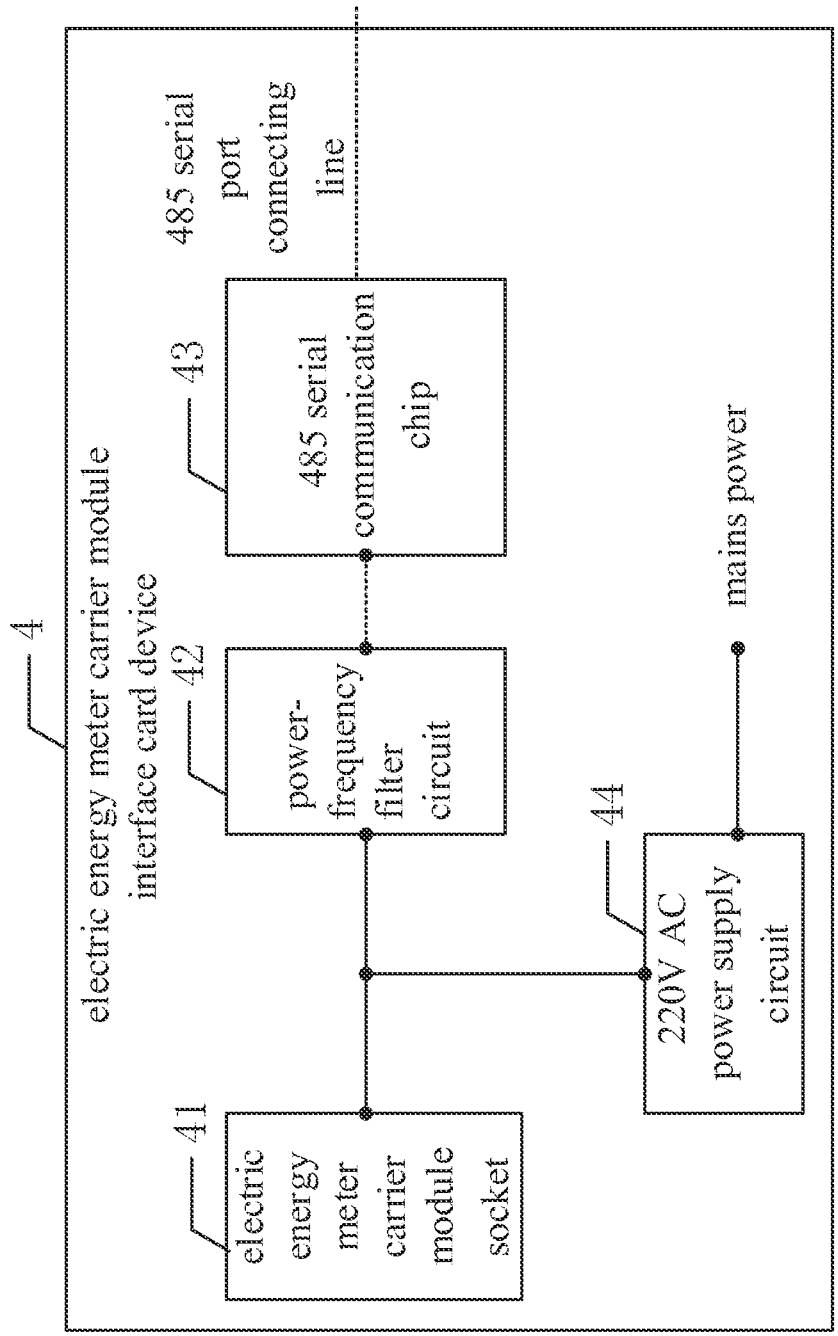
FIG. 18 is a structural block diagram of an electric energy meter carrier module interface card device in the present invention.

FIG. 18 is a structural block diagram of the electric energy meter carrier module interface card device 4. As shown in FIG. 18, the electric energy meter carrier module interface card device 4 includes an electric energy meter carrier module socket 41, a power-frequency filter circuit 42, a 485 serial communication chip 43 and a 220V AC power supply circuit 44, wherein the electric energy meter carrier module socket 41 is connected with the acquisition terminal carrier communication module in a physical and circuit connection manner; the power-frequency filter circuit 42 is configured to filter 50 Hz power-frequency signals to extract carrier signals and transmit the carrier signals to the centralized control computer 26; the 485 serial communication chip 43 is configured to implement two-way communication with the centralized control computer 26; and the 220V AC power supply circuit 44 is configured to provide electric energy for the circuits on the electric energy meter carrier module interface card device 4.

The system in the embodiment of the present invention further includes the purification power supply subsystem 25 of which the specific structure will be described in detail below.

Figure 19:
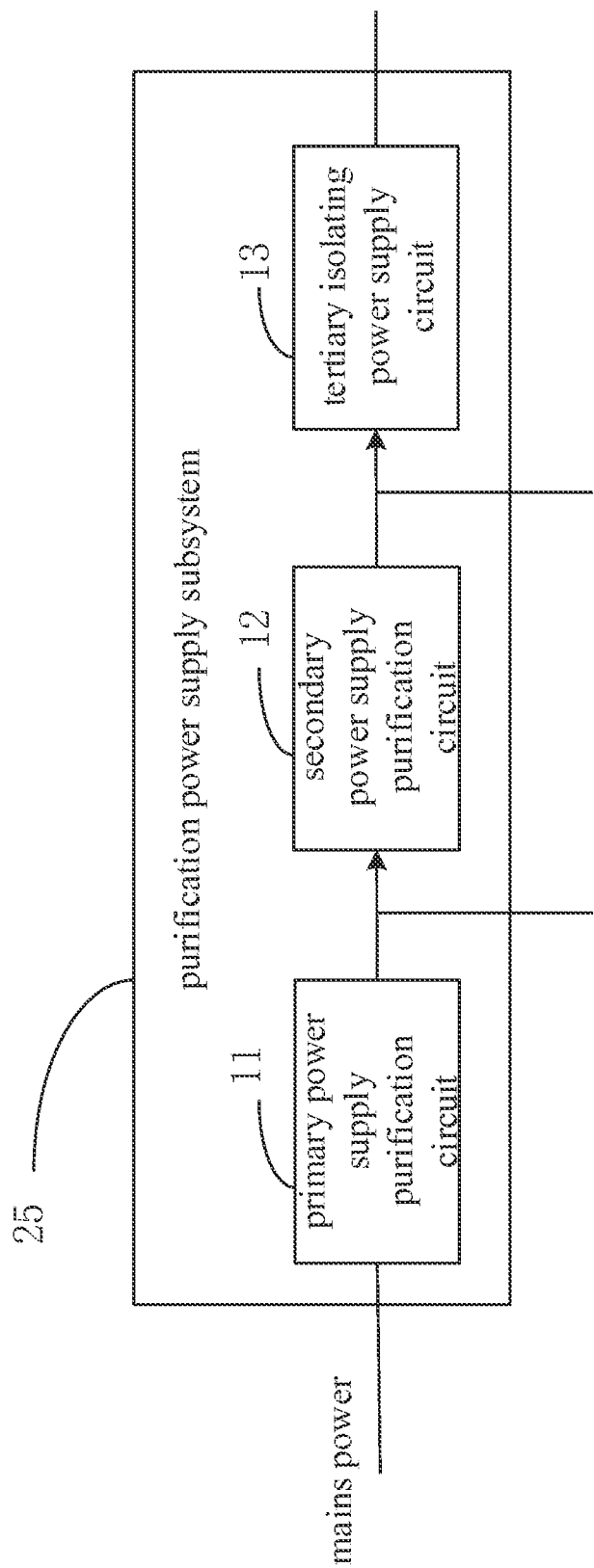
FIG. 19 is a structural schematic diagram of a purification power supply subsystem provided in the present invention.

As the contents described in detail in FIG. 19, the purification power supply subsystem 25 includes: a primary power supply purification circuit 11, configured to provide electric energy and first predetermined matched impedance for the interior of the system and isolate interference noise of an external power supply, wherein the first predetermined matched impedance may be preset by the system, e.g. may be 50 ohms; a secondary power supply purification circuit 12, configured to isolate clutter and crosstalk in the system and provide electric energy for the acquisition terminal carrier module interface card device; and a tertiary isolating power supply circuit 13, configured to isolate the carrier signals between the acquisition terminal carrier module interface card device and the electric energy meter carrier module interface card device.

Specifically, the primary power supply purification circuit 11 takes charge of isolating noise in a mains power supply and matching the impedance of the simulation system to 50 ohms, and the circuit isolated by the primary power supply purification circuit 11 supplies power to the simulation circuit and devices in the test system. The secondary power supply purification circuit 12 takes charge of isolating clutter and crosstalk generated by auxiliary circuits in the simulation system, and the circuit isolated by the secondary power supply purification circuit 12 supplies power to the acquisition terminal carrier module interface card device 4 and the acquisition terminal carrier module assembled thereon. The tertiary isolating power supply circuit 13 takes charge of isolating signals, e.g. isolating high-frequency signals between the acquisition terminal carrier module interface card device 4 and the electric energy meter carrier module interface card device 5, and the tertiary isolating power supply circuit 13 may prevent the carrier signals between the electric energy meter carrier module and the acquisition terminal carrier module from interfering with each other through a power supply loop, so that the carrier signals may only be transmitted through a specified communication channel.

To further understand the purification power supply subsystem 25, the above three circuits will be respectively described in detail below.

Figure 20:
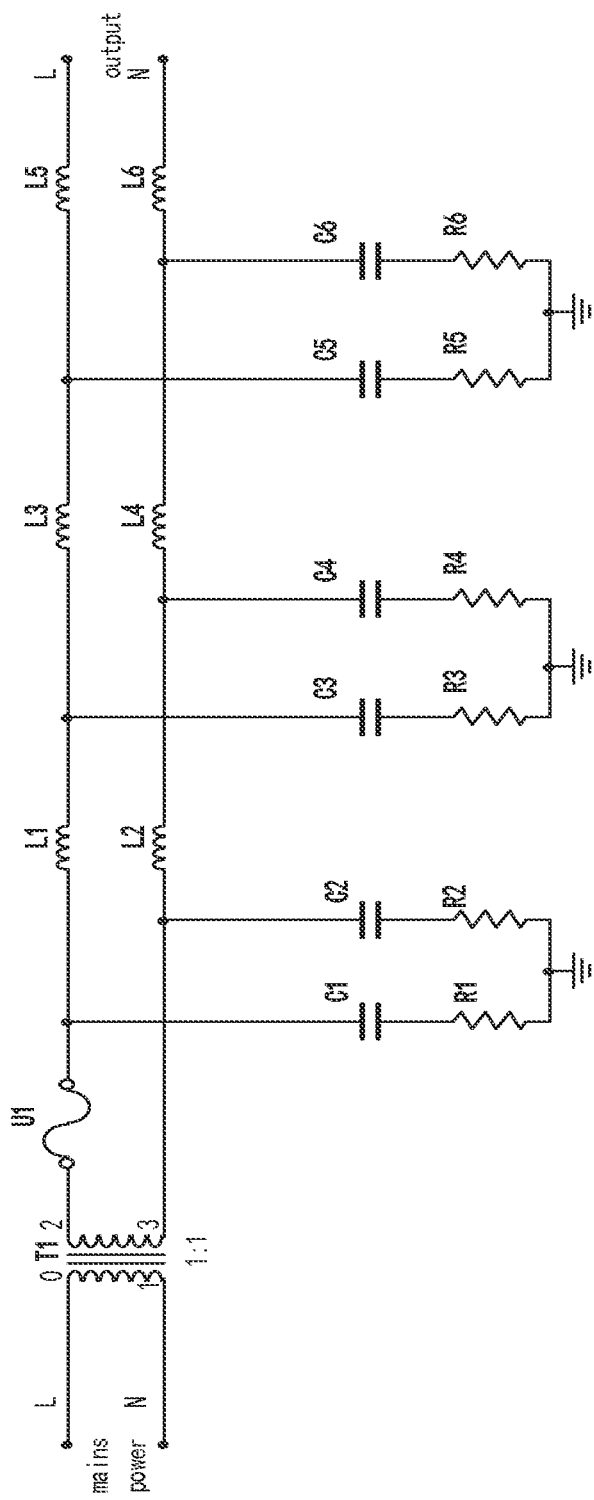
FIG. 20 is a circuit schematic diagram of a primary power supply purification circuit in the present invention.

FIG. 20 is a circuit schematic diagram of the primary power supply purification circuit 11. As shown in FIG. 20, the primary power supply purification circuit 11 consists of an isolating transformer and impedance stabilizing circuits, wherein an isolating transformer circuit T1 filters signals for the first time; a fuse U1 is configured to ensure that current meets the requirement; inductors L1 and L2, capacitors C1 and C2 and resistors R1 and R2 form a primary low-pass filter and impedance stabilizing loop; inductors L3 and L4, capacitors C3 and C4 and resistors R3 and R4 form a secondary low-pass filter and impedance stabilizing loop; and inductors L5 and L6, capacitors C5 and C6 and resistors R5 and R6 form a tertiary low-pass filter and impedance stabilizing loop. The isolating transformer may be used for isolating external interference, and the linear impedance stabilizing circuits may be used for purifying high-frequency noise and stabilizing channel impedance.

Figure 21:
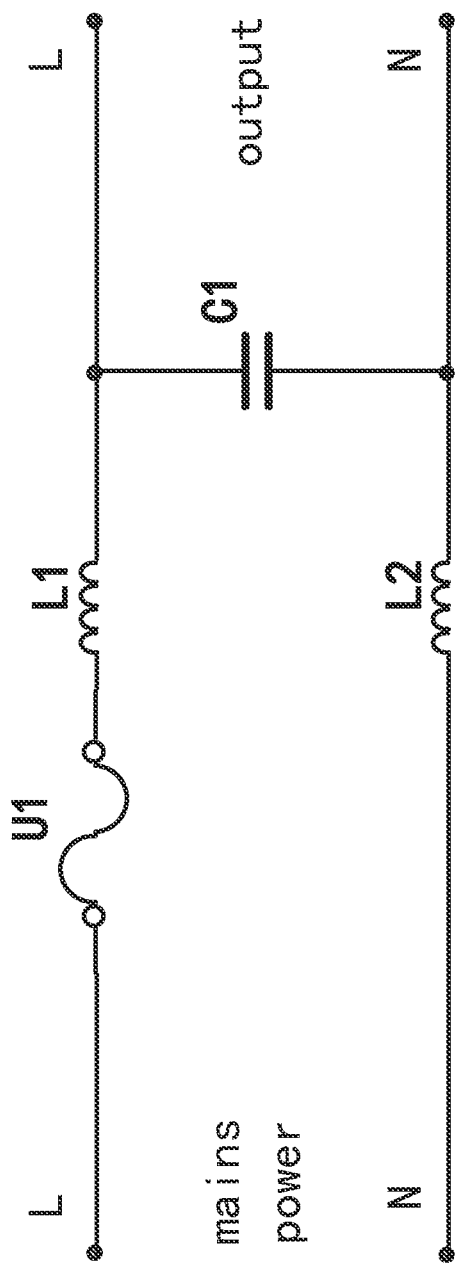
FIG. 21 is a circuit schematic diagram of a secondary power supply purification circuit in the present invention.

FIG. 21 is a circuit schematic diagram of the secondary power supply purification circuit 12. As shown in FIG. 21, the secondary power supply purification circuit 12 consists of a low-pass filter circuit, wherein a fuse U1 is configured to ensure that current meets the requirement; and inductors L1 and L2 and a capacitor C1 form the low-pass filter loop. Clutter and crosstalk generated by various auxiliary devices and channel characteristic simulation circuits in the test system may be isolated by the secondary power supply purification circuit 12.

Figure 22:
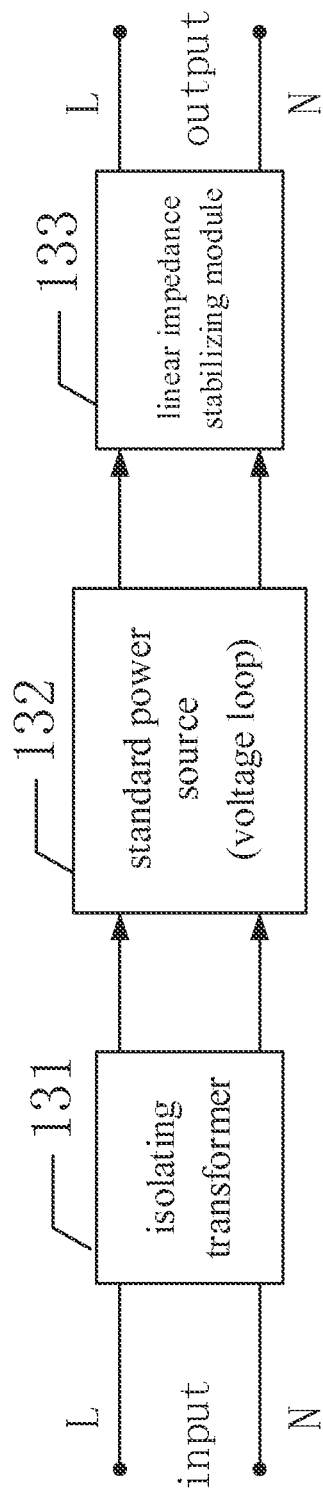
FIG. 22 is a circuit schematic diagram of a tertiary isolating power supply circuit 13 in the present invention.

FIG. 22 is a circuit schematic diagram of the tertiary isolating power supply circuit 13. As shown in FIG. 22, the tertiary isolating power supply circuit 13 includes an isolating transformer 131, a standard power source 132 and a linear impedance stabilizing module 133, wherein the isolating transformer 131 is configured to receive signals from the secondary power supply purification circuit 12 and perform low-pass filter on the signals to filter high-frequency clutter and noise; the standard power source 132 is configured to isolate carrier signals between the acquisition terminal carrier module interface card device and the electric energy meter carrier module interface card device, namely completely isolate input and output electric energy signals to ensure electrical characteristic isolation between the acquisition terminal carrier module interface card device and the electric energy meter carrier module interface card device, and because only the voltage loop of the standard power source 132 is adopted, the load of the circuit would be reduced; and the linear impedance stabilizing module 133 is configured to provide second predetermined matched impedance for the electric energy meter carrier module interface card device, wherein the second predetermined matched impedance is standard 50 ohm matched impedance. High-frequency signal isolation between the acquisition terminal carrier module interface card device and the electric energy meter carrier module interface card device may be realized through the tertiary isolating power supply circuit 13, so that the carrier signals between the electric energy meter carrier module and the acquisition terminal carrier module may not interfere with each other through the power supply loop and may only be transmitted through the specified communication channel.

Further, the purification power supply subsystem further includes: a fourth isolating transformer, a third EMI filter and a third linear impedance stabilizing network connected with the detected receiver, which are sequentially arranged at the detected product receiver end; or an AC-DC converter for converting an AC power-frequency power supply into a DC power supply, a DC-AC inverter for converting the DC power supply into the AC power supply and a fourth linear impedance stabilizing network connected with the detected receiver, which are sequentially arranged at the detected receiver end.

The test system provided by the embodiment of the present invention has integrated unique capabilities of simulating the complex noise environment, nonlinear impedance change characteristic, multipath network attenuation characteristic and signal loss characteristic of the low-voltage distribution network, and may be used for quantitatively testing the indexes including transmitting performance, transceiving success rate, receiving success rate, receiving sensitivity, attenuation resistance, noise resistance, impedance adaptability and the like of the low-voltage power carrier communication device. Compared with the prior art, the test system of the embodiment of the present invention is simple in implementation and low in cost and may be used for accurately and comprehensively simulating the basic characteristics of the low-voltage power line carrier communication channel.

In conclusion, the communication channel simulation system of the intelligent power utilization communication system provided by the embodiments of the present invention has the following beneficial effects:

(1) the system may comprehensively simulate the channel characteristics of the remote communication channel and the local communication channel, so that the communication performance of the whole intelligent power utilization communication system may be really and accurately reflected, and good reference information may be provided for communication channel construction of the practical intelligent power utilization communication system;

(2) by adopting the two power supply purification circuits, external interference and noise may be effectively isolated, meanwhile, matched impedance may be provided for the system, and good electric isolation of the acquisition terminal and the electric energy meter may be realized;

(3) the devices in the system are intensively controlled and coordinated by adopting the centralized control computer, so that automation and remote control of channel characteristic simulation may be realized, hidden dangers of manual operation errors are avoided, and external interference is reduced; and (4) the whole system adopts commercially common devices, so that the system is convenient to assemble and disassemble and low in manufacturing cost and facilitates batch production, popularization and application.

The objectives, technical solutions and beneficial effects of the present invention are further described in detail above through the specific embodiments. It should be understood that, the foregoing descriptions are merely the specific embodiments of the present invention, and are not used for limiting the protection scope of the present invention. Any modification, equivalent substitution, improvement and the like made within the spirit and principle of the present invention should be included in the protection scope of the present invention.

The invention claimed is:

1. An intelligent power utilization communication product detecting system, comprising:
    a simulation master station,
    a remote wireless communication test and channel simulation subsystem,
    a local communication test and channel simulation subsystem, and
    a purification power supply subsystem;
    wherein the simulation master station comprises a simulation master station computer and a simulation master station control unit and is connected with the remote wireless communication test and channel simulation subsystem; the simulation master station is configured to perform information interaction with a detected product through the remote wireless communication test and channel simulation subsystem, control the detected product and determine the communication performance of the detected product according to the information interaction result;
    wherein the remote wireless communication test and channel simulation subsystem is connected with the master station computer and the detected product respectively, and is configured to simulate the channel characteristic of a wireless private network communication channel and/or the channel characteristic of a wireless public network communication channel, convert signals transmitted between the master station computer and the detected product and simulate the influence on the signals in the transmission process;
    wherein the local communication test and channel simulation subsystem is connected with each detected product, and is configured to simulate the channel characteristic of a local communication channel, convert signals transmitted between the detected products and simulate the influence on the signals in the transmission process; and
    wherein the purification power supply subsystem is connected with the master station computer, the remote wireless communication test and channel simulation subsystem, the local communication test and channel simulation subsystem and each detected product respectively, and is configured to provide electric energy and matched impedance and isolate interference noise.

2. The intelligent power utilization communication product detecting system of claim 1, further comprising:
    a centralized control computer, wherein the centralized control computer is connected with the remote wireless communication test and channel simulation subsystem and the local communication test and channel simulation subsystem and configured to determine the channel characteristic of a remote communication channel, control the remote wireless communication test and channel simulation subsystem to work, determine the channel characteristic of a local communication channel and control the local communication test and channel simulation subsystem to work.

3. The intelligent power utilization communication product detecting system of claim 1, wherein the remote wireless communication test and channel simulation subsystem simulates the channel characteristic of the wireless public network communication channel according to a 2G/3G wireless public network channel model and/or simulates the channel characteristic of the wireless private network communication channel according to a 230MHz wireless private network channel model.

4. The intelligent power utilization communication product detecting system of claim 1,
    wherein the remote wireless communication test and channel simulation subsystem further comprises a wireless comprehensive tester, a wireless public network channel simulator and a radio-frequency attenuator;
    wherein the wireless comprehensive tester is connected with the master station computer, the wireless public network channel simulator and the radio-frequency attenuator respectively and configured to perform bottom layer protocol processing on signals transmitted by the master station computer and then transmit the processed signals to the wireless public network channel simulator, perform downlink wireless comprehensive test processing on signals returned by the wireless public network channel simulator and then transmit the processed signals to the radio-frequency attenuator, perform uplink wireless comprehensive test processing on signals transmitted by the radio-frequency attenuator and then transmit the processed signals to the wireless public network channel simulator, perform bottom layer protocol processing on the signals returned by the wireless public network channel simulator and then transmit the processed signals to the master station computer;
    wherein the wireless public network channel simulator is connected with the wireless comprehensive tester and configured to simulate the channel characteristic of the wireless private network communication channel and/or the channel characteristic of the wireless public network communication channel; and wherein the radio-frequency attenuator is connected with the wireless comprehensive tester and an acquisition terminal respectively and configured to simulate the attenuation characteristic of radio-frequency signals and attenuate signals transmitted between the wireless comprehensive tester and the acquisition terminal.

5. The intelligent power utilization communication product detecting system of claim 4, wherein the wireless public network channel simulator simulates the channel characteristic of a 2G/3G wireless cellular network communication channel, performs 2G/3G wireless cellular network communication channel characteristic influence simulation on the signals transmitted by the wireless comprehensive tester and then returns the signals to the wireless comprehensive tester.

6. The intelligent power utilization communication product detecting system of claim 4, wherein the centralized control computer is connected with the wireless comprehensive tester, the wireless public network channel simulator and the radio-frequency attenuator respectively, and is specifically configured to determine the channel characteristic of the 2G/3G wireless cellular network communication channel and control the wireless comprehensive tester, the wireless public network channel simulator and the radio-frequency attenuator to work.

7. The intelligent power utilization communication product detecting system of claim 1, wherein the local communication test and channel simulation subsystem comprises a micro-power wireless communication test and channel simulation subsystem and a low-voltage power carrier communication detection and channel simulation subsystem.

8. The intelligent power utilization communication product detecting system of claim 7,
wherein the micro-power wireless communication test and channel simulation subsystem specifically comprises a spectrum analyzer, a receiver tester, a vector signal source, an index testing computer and circulators;
wherein the spectrum analyzer is configured to down-convert tested signals into intermediate frequency signals by using internal local oscillation and transmit the intermediate frequency signals to the receiver tester for analysis; the receiver tester is configured to digitally process the intermediate frequency signals input by the spectrum analyzer, perform attenuation simulation on the digital signals, set corresponding channel parameters according to different application environments and simulate the attenuation characteristic when the tested signals pass through different districts; the vector signal source is configured to up-convert the signals simulated by the receiver tester, convert the intermediate frequency signals to the frequency of the originally input radio-frequency signals and set the attenuation value of the signals in the whole simulation process; and
wherein the index testing computer is configured to control signal transmission and test and analyze the signals up-converted by the vector signal source; and the circulators are connected with the spectrum analyzer and the vector signal source respectively and configured to isolate a transmitting link and a receiving link of the whole system, so that the whole system forms a two-way link.

9. The intelligent power utilization communication product detecting system of claim 8, wherein the centralized control computer is connected with the low-voltage distribution network channel characteristic simulation device, the acquisition terminal carrier module interface card device and the electric energy meter carrier module interface card device, and is configured to communicate with the acquisition terminal carrier module interface card device to test the communication devices, communicate with the electric energy meter carrier module interface card device to test the electric energy meter and control low-voltage distribution network channel characteristic simulation of the low-voltage distribution network channel characteristic simulation device.

10. The intelligent power utilization communication product detecting system of claim 7,
wherein the low-voltage power carrier communication detection and channel simulation subsystem specifically comprises a low-voltage distribution network channel characteristic simulation device, an acquisition terminal carrier module interface card device and an electric energy meter carrier module interface card device;
wherein the low-voltage distribution network channel characteristic simulation device is connected with the purification power supply subsystem and configured to simulate low-voltage distribution network channel characteristics including noise characteristic, transmission impedance characteristic, loss attenuation characteristic, multipath transmission interference characteristic and load impedance characteristic of signals output by the purification power supply subsystem;
wherein the acquisition terminal carrier module interface card device is connected with the purification power supply subsystem and the low-voltage distribution network channel characteristic simulation device and configured to provide electric energy and communication connection for the communication devices connected with the acquisition terminal carrier module interface card device; and
wherein the electric energy meter carrier module interface card device is connected with the purification power supply subsystem and the low-voltage distribution network channel characteristic simulation device and configured to provide electric energy and communication connection for an electric energy meter connected with the electric energy meter carrier module interface card device.

11. The intelligent power utilization communication product detecting system of claim 1,
wherein the purification power supply subsystem comprises a first isolating circuit, a second isolating circuit and a third isolating circuit; and
wherein, the first isolating circuit is arranged between an external power supply network and the communication system, the second isolating circuit is arranged between the communication system and the detected product, and the third isolating circuit is arranged in a communication channel between a detected transmitter and a detected receiver of the detected product.

12. The intelligent power utilization communication product detecting system of claim 11,
wherein the first isolating circuit comprises a circuit breaker, a first isolating transformer for isolating high-frequency noise and pulse noise, a first linear impedance stabilizing network for inhibiting same frequency interference of a test band, a leakage protector and an air switch, which are sequentially connected with each other;
wherein the second isolating circuit comprises a second isolating transformer, a first EMI filter for filtering power supply noise and an inductive magnet ring for inhibiting space coupling noise and tester conducting noise, which are sequentially connected with each other; and wherein the third isolating circuit comprises a third isolating transformer arranged at the detected transmitter end, a second EMI filter and a second linear impedance stabilizing network connected with the detected transmitter, which are sequentially connected with each other.

13. The intelligent power utilization communication product detecting system of claim 11, wherein the purification power supply subsystem further comprises one of:

a fourth isolating transformer, a third EMI filter and a third linear impedance stabilizing network connected with the detected receiver, which are sequentially arranged at the receiver end of the detected product;

or, an AC-DC converter for converting an AC power-frequency power supply into a DC power supply, a DC-AC inverter for converting the DC power supply into the AC power supply and a fourth linear impedance stabilizing network connected with the detected receiver, which are sequentially arranged at the detected receiver end.

* * * * *